US010631681B2

(12) United States Patent
Bolognese et al.

(10) Patent No.: US 10,631,681 B2
(45) Date of Patent: Apr. 28, 2020

(54) SYSTEM FOR THE PREPARATION OF BEVERAGES

(71) Applicants: LUIGI LAVAZZA S.P.A, Turin (IT); POLITECNICO DI TORINO, Turin (IT)

(72) Inventors: Danilo Bolognese, Turin (IT); Elvio Bonisoli, Turin (IT); Luca Bugnano, Moncalieri (IT); Alberto Cabilli, Moncalieri (IT); Denis Rotta, Turin (IT); Alfredo Vanni, Chieri (IT)

(73) Assignee: LUIGI LAVAZZA S.p.A, Turin (IT)

( * ) Notice: Subject to any disclaimer, the term of this patent is extended or adjusted under 35 U.S.C. 154(b) by 1023 days.

(21) Appl. No.: 14/903,213

(22) PCT Filed: Jul. 9, 2014

(86) PCT No.: PCT/IB2014/062968
§ 371 (c)(1),
(2) Date: Jan. 6, 2016

(87) PCT Pub. No.: WO2015/004613
PCT Pub. Date: Jan. 15, 2015

(65) Prior Publication Data
US 2016/0150907 A1    Jun. 2, 2016

(30) Foreign Application Priority Data
Jul. 12, 2013    (IT) .............. TO2013A0589

(51) Int. Cl.
*A47J 31/36*    (2006.01)
*A47J 31/06*    (2006.01)

(52) U.S. Cl.
CPC ....... *A47J 31/3633* (2013.01); *A47J 31/0647* (2013.01)

(58) Field of Classification Search
CPC .... A47J 31/0647; A47J 31/3633; A47J 31/02; A47J 31/0626; A47J 31/4492; A47J 31/06; A47J 31/0689
(Continued)

(56) References Cited

U.S. PATENT DOCUMENTS

2011/0265659 A1\* 11/2011 Giua .................. A47J 31/3676
99/295
2012/0171334 A1\* 7/2012 Yoakim .................. A47J 31/22
426/87

FOREIGN PATENT DOCUMENTS

| EP | 1 208 782 A1 | 5/2002 |
| WO | 2004/112556 A1 | 12/2004 |
| WO | 2013/079811 A1 | 6/2013 |

OTHER PUBLICATIONS

International Search Report for PCT/IB2014/062968 dated Nov. 4, 2014.
Written opinion for PCT/IB2014/062968 dated Nov. 4, 2014.

\* cited by examiner

*Primary Examiner* — Dana Ross
*Assistant Examiner* — James F Sims, III
(74) *Attorney, Agent, or Firm* — Sughrue Mion, PLLC

(57) ABSTRACT

The system comprises:
  capsules (C) of at least a first type and a second type, having outwardly protruding transverse flanges (32), and respective different axial lengths (h1, h2, h3), and
  a brewing unit (6, 20, 7), in which there is defined a variable-volume brewing chamber (100) with a lateral delimiting part (81, 81*a*) and a slidable end delimiting part (54, 55), for receiving capsules (C) of said types introduced into the chamber (100).
The capsules (C) of the aforementioned different types have flanges (32) of correspondingly different shapes, and the end
(Continued)

delimiting part (54, 55) of the brewing chamber (100) carries stop members (70, 71) adapted to be coupled to the flanges (32) of said different types of capsules (C) when the latter are introduced into the brewing chamber (100), so as to allow correspondingly different relative movements of the end delimiting part (54, 55) relative to the lateral delimiting part (81, 81*a*) of said chamber (100).

15 Claims, 23 Drawing Sheets

(58) Field of Classification Search
USPC .............................. 99/289 R, 295, 316, 323
See application file for complete search history.

SYSTEM FOR THE PREPARATION OF BEVERAGES

CROSS REFERENCE TO RELATED APPLICATIONS

This application is a National Stage of International Application No. PCT/IB2014/062968 filed Jul. 9, 2014, claiming priority based on Italian Patent Application No. TO2013A000589 filed Jul. 12, 2013, the contents of all of which are incorporated herein by reference in their entirety.

BACKGROUND OF THE INVENTION

Field of the Invention

The present invention relates to a system for the preparation of beverages by brewing, using prepackaged capsules, preferably of the sealed type, containing a quantity of a substance, for example ground roast coffee, for the preparation of a beverage.

Background

More specifically, the invention relates to a system comprising, in a known way:
  capsules of at least a first type and a second type, having respective outwardly protruding transverse flanges, and respective different axial lengths, and
  a brewing unit, in which there is defined a variable-volume brewing chamber with a lateral delimiting part and a slidable end delimiting part, for receiving capsules of said first and second type introduced into said chamber.

A system of this type for the preparation of beverages is described and illustrated in European patent application EP 1 208 782 A1.

In this known system, a capsule, selectively of a first or a second type, is made to bear on a loading plate which, by means of a manually operated control lever, is then translated horizontally and subsequently raised vertically, so as to introduce this capsule into the brewing chamber formed in a percolation unit. The arrangement is such that the operation of the control lever simultaneously causes a lowering of the percolation unit. The latter comprises a lateral delimiting part of the brewing chamber, in which an end delimiting part of said chamber is vertically slidable in a liquid-tight way. Because of the coupling between the loading plate and the percolation unit, the capsule causes a movement of the delimiting part of the brewing chamber, as a function of the axial length of the capsule. The percolation unit is also provided with a device for locking the end delimiting part of the brewing chamber. This locking device comprises a transverse locking pin which can be pushed so as to engage with said end delimiting part of the brewing chamber by a cam member, in the terminal part of the operating stroke of the aforesaid control lever.

In this known system, the capsules must have a rather robust structure, since it is their bodies that act by means of mechanical force to cause the volume of the brewing chamber to be adapted to the axial length of the capsule used.

International patent application WO2004/112556A1 describes another system comprising a machine including a brewing unit with a variable-volume chamber into which the user can selectively introduce one or more capsules of filter paper.

SUMMARY OF THE INVENTION

One object of the present invention is to provide an improved system for the preparation of beverages which allows the use of sealed capsules of at least two different types, having different respective axial lengths.

This and other objects are achieved according to the invention by means of a system for the preparation of beverages of the type defined initially, characterized in that the capsules of said different types have flanges of correspondingly different shapes, and the aforesaid end delimiting part of the brewing chamber carries stop means adapted to be coupled to the flanges of said different types of capsules when the latter are introduced into the brewing chamber, so as to allow correspondingly different relative movements of the end delimiting part with respect to the lateral delimiting part of said chamber.

As will be more clearly apparent from the following text, in the system for the preparation of beverages according to the present invention the type of capsule used on each occasion is "recognized" mechanically, and the configuration of the brewing chamber is determined accordingly, as a function of the specific shape of the transverse flange of the capsule used on each occasion.

Conveniently, the aforesaid lateral delimiting part of the variable-volume brewing chamber is movable relative to a bearing structure which is stationary in operation, and the brewing unit has associated locking means capable of being driven by a movement of the lateral delimiting part of the brewing chamber, for locking the position of the end delimiting portion in a relative position which is different for each said type of capsule.

In one embodiment, these locking means comprise a drum, integral with the end delimiting part of the brewing chamber, and at least one block connected to the lateral delimiting part of the chamber in such a way that a movement of the latter relative to the bearing structure is able to cause the application of said at least one block against a surface of the drum.

In another embodiment, the locking means comprise at least one rack integral with the end delimiting part of the brewing chamber, and at least one toothed member which is movable, under control by the lateral delimiting part of said chamber, between a rest position and a working position in which it is, respectively, disengaged from and engaged with said at least one rack.

In the capsules used in the system according to the present invention, the transverse flange may have at least one indentation or protrusion having a perimetric dimension which is correlated with the axial length or height of said capsules.

This transverse flange may have an essentially polygonal, preferably quadrangular, general shape, but other shapes can also be used.

BRIEF DESCRIPTION OF THE DRAWINGS

Further characteristics and advantages of the invention will be made clear by the following detailed description, provided purely by way of non-limiting example, with reference to the appended drawings, in which.

DETAILED DESCRIPTION OF THE INVENTION

Figure 1:
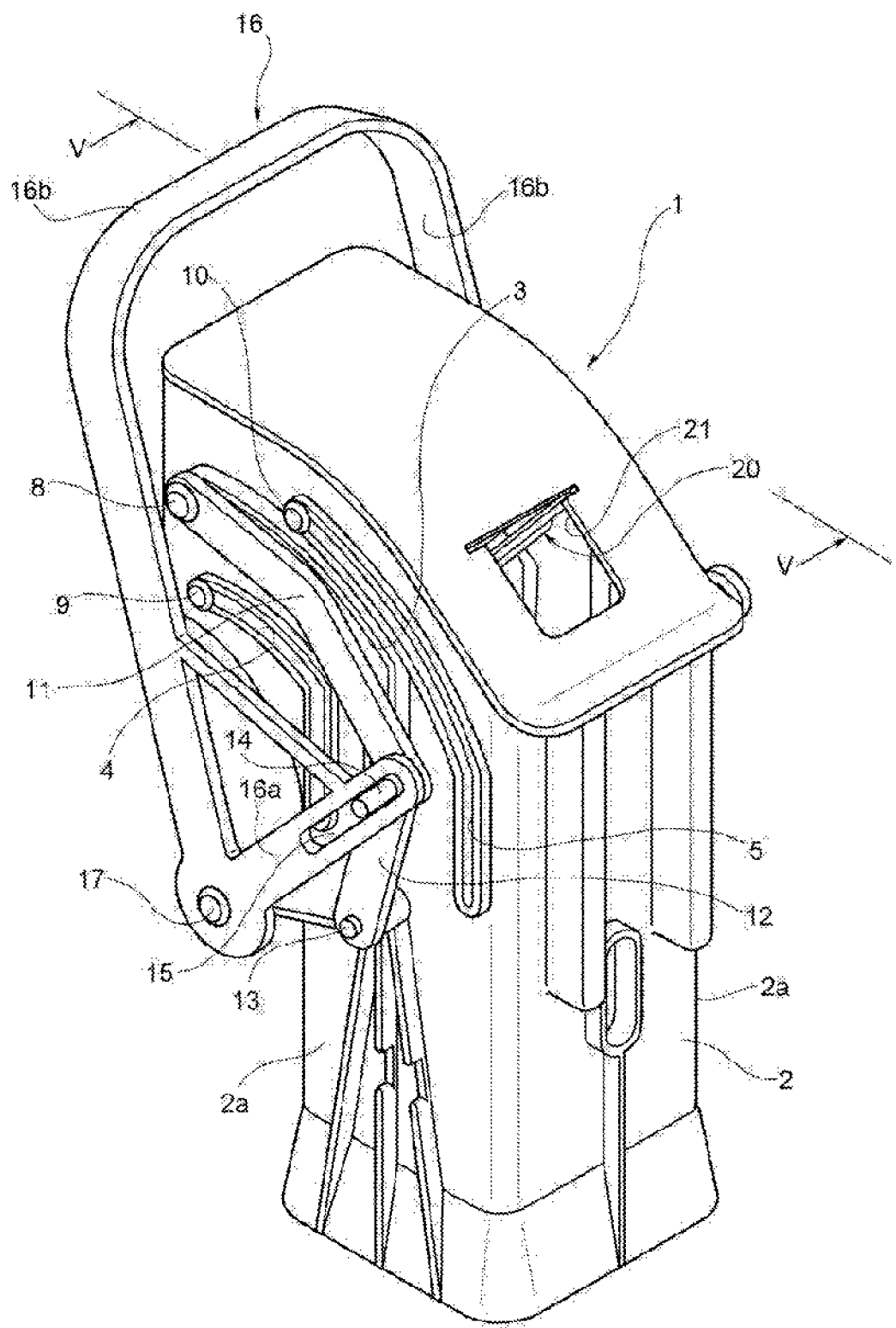
FIG. 1 is a perspective view of a machine for the preparation of beverages that can be used in a system according to the present invention.

The number 1 in FIG. 1 indicates the whole of a machine for the preparation of beverages by brewing, forming part of a system according to the present invention.

In the illustrated exemplary embodiment, the machine 1 comprises a bearing structure including a support casing 2 which extends predominantly in a vertical direction.

Figure 7:
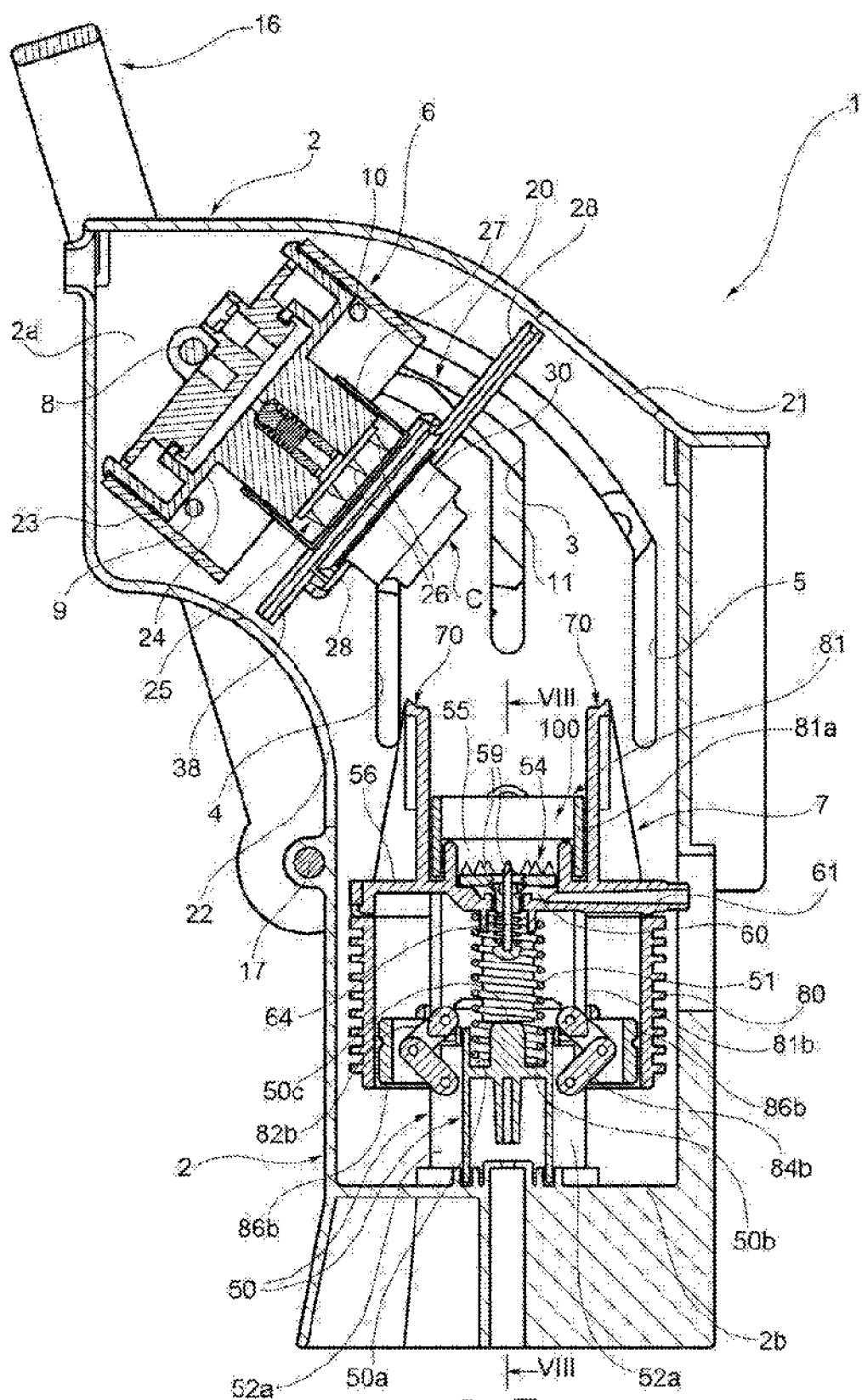
FIG. 7 is a view similar to that presented in FIG. 5, and shows another step of a beverage preparation cycle.
Figure 8:
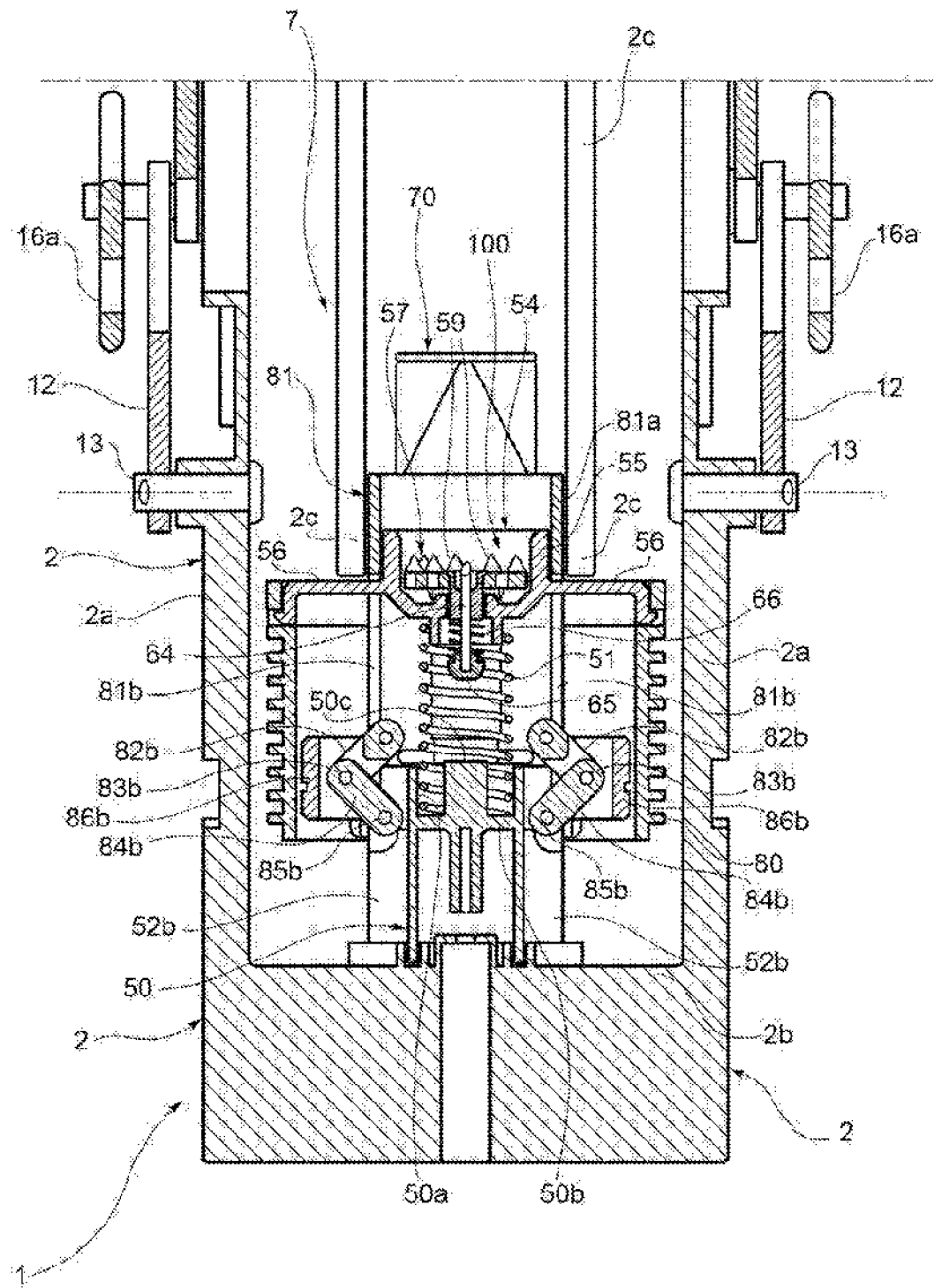
FIG. 8 is a partial sectional view taken along the line VIII-VIII of FIG. 7.

As can be seen in FIGS. 1 and 8 in particular, the support casing has two facing vertical walls 2a, essentially parallel to each other, in each of which are formed three guide slots indicated by 3, 4 and 5 (see also FIGS. 5, 7, 9, 12 and 13).

Figure 5:
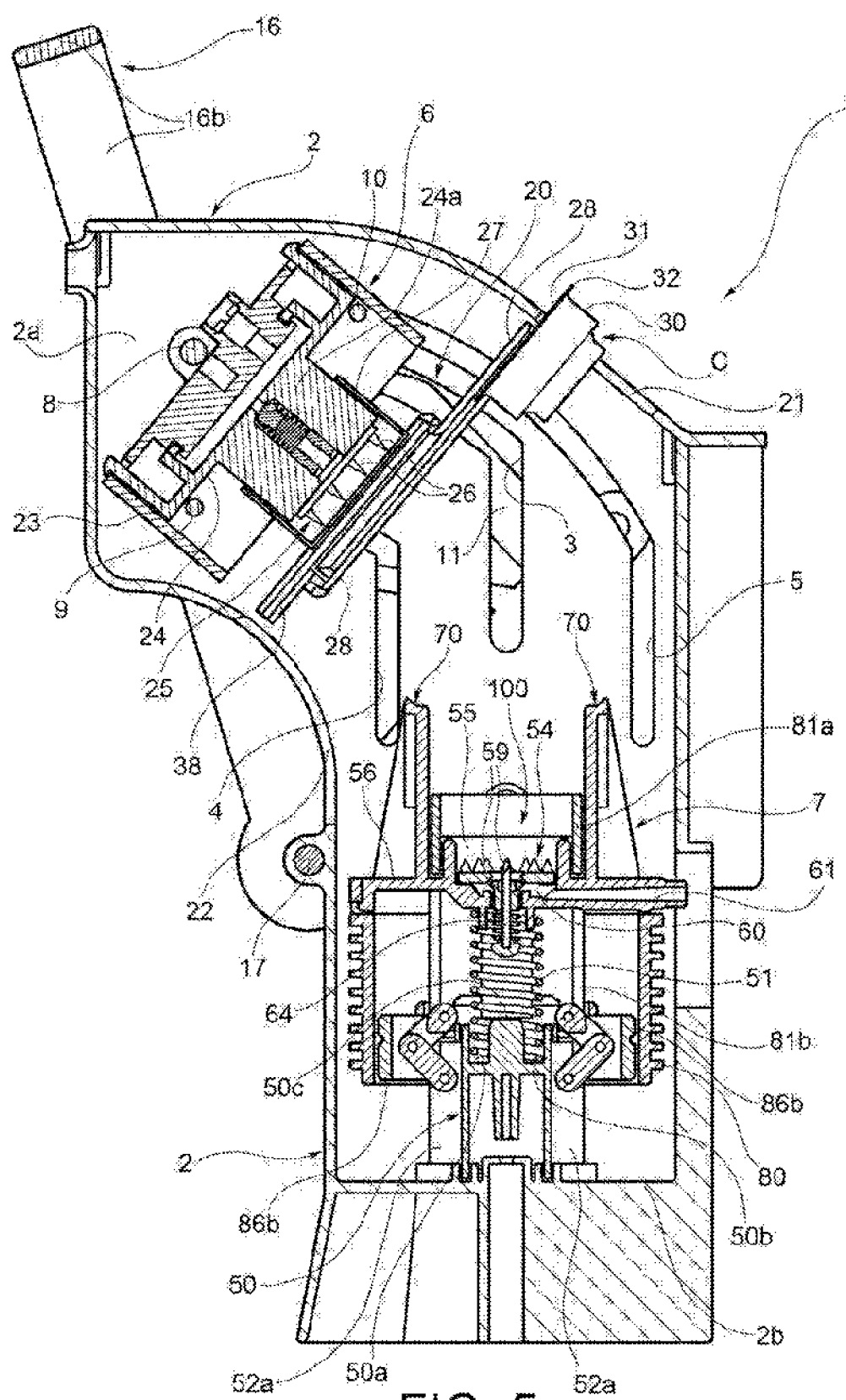
FIG. 5 is a partial sectional view taken along the line V-V of FIG. 1, and shows a step of a beverage preparation cycle.

As can be seen, for example, in FIG. 5, a brewing unit is mounted inside the support casing 2, and comprises a movable head 6 for hot water and/or steam injection, and an associated capsule carrier unit indicated as a whole by 7.

The injection head 6 has three guide pins 8, 9 and 10 which extend into the slots 3, 4 and 5 respectively and are slidable in a guided way therein.

As can be seen in particular in FIGS. 5 and 7, the slots 3, 4 and 5 have corresponding curved upper portions and corresponding essentially vertical lower portions.

Outside the support casing 2, the upper ends of links 11 are pivoted on the pin 8. The lower ends of these links 11 are pivoted on corresponding cranks 12 rotatable about respective fixed horizontal axes 13.

In the illustrated embodiment, the pivot joint between each link 11 and the corresponding crank 12 is formed by means of a pin 14, which extends in a slot 15 in the form of a slideway, formed in the smaller arm 16a of a manually operated control lever, indicated as a whole by 16.

The control lever 16 is pivoted on the support casing 2 so as to be rotatable about a horizontal axis 17, parallel to the axis 13 of rotation of the cranks 12.

In the illustrated embodiment, the control lever 16 has a main arm 16b, essentially in the form of an inverted U, which extends above and at the sides of the support casing 2.

Figure 12:
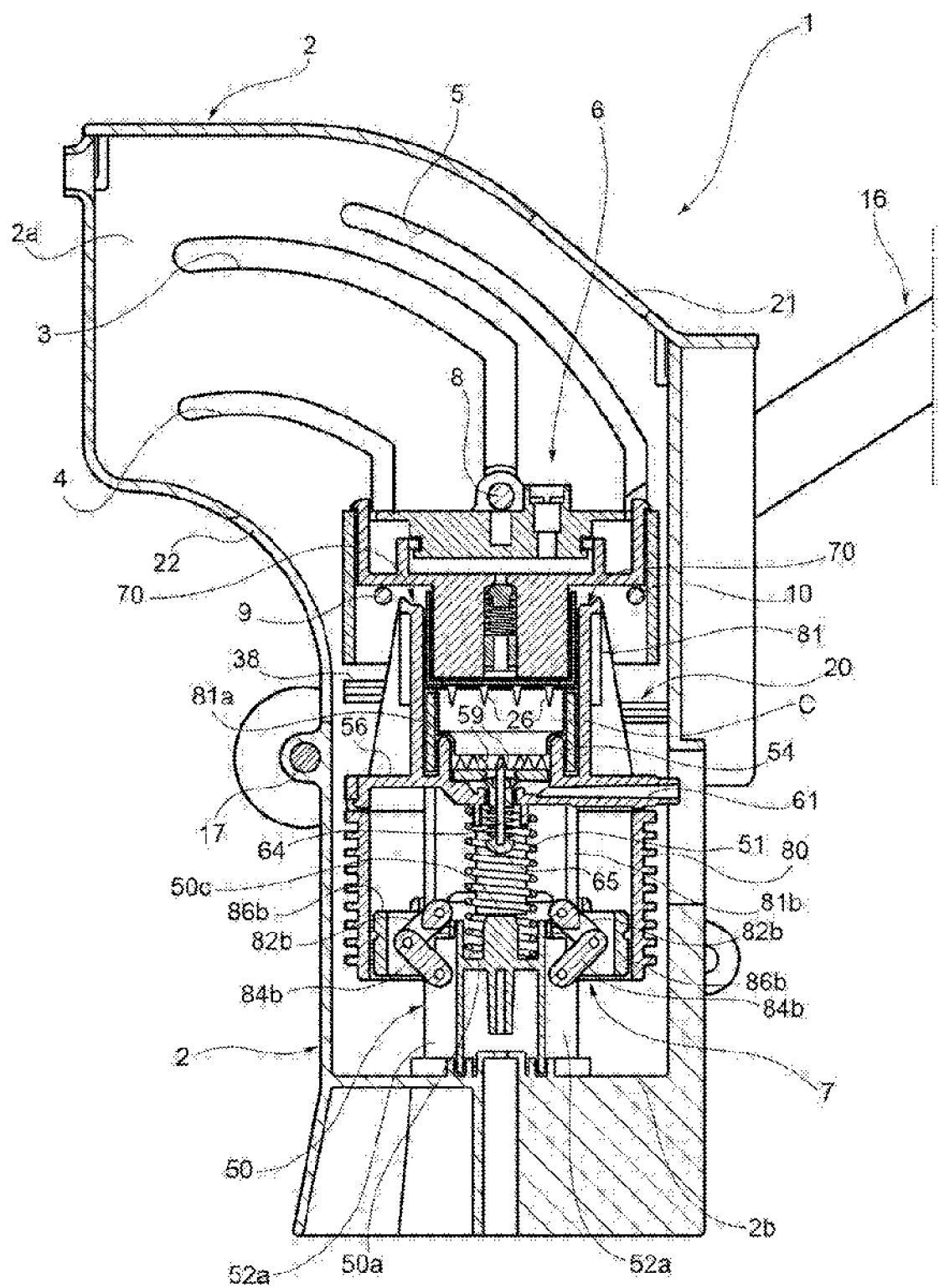
FIG. 12 is a view similar to that of FIGS. 7 and 9, and shows another step of a beverage preparation cycle.

The arrangement is such that, by operating the control lever 16, a user can cause a movement of the injection head 6 from an upper rest position, shown in FIGS. 5 and 7, to a lower working position shown in FIG. 12.

In the initial part of the travel from the rest position towards the working position, the injection unit 6 is moved while remaining in a substantially oblique attitude along the curved upper portions of the guide slots 3, 4 and 5. On the other hand, in the end part of this travel, the injection unit 6 is translated vertically, towards the capsule carrier unit 7, along the vertical lower portions of said slots.

The injection unit 6 is associated with a device 20 for receiving, retaining and guiding, and subsequently expelling a capsule C used for the preparation of a beverage (see for example FIGS. 5-7, 12 and 13).

With particular reference to FIGS. 1 and 5, the support casing 2 of the machine 1 has an upper opening 21 adapted to allow the introduction of capsules of different types, particularly those having different longitudinal heights or lengths.

On the opposite side, the support casing 2 has a further opening 22, through which the capsule used on each occasion for the preparation of a beverage can be discharged, essentially by gravity, as described more fully below.

The system for the preparation of beverages according to the present invention provides for the use of capsules of a plurality of types, having respective outwardly protruding transverse flanges, and respective different axial lengths.

A first group of three different types of capsule that can be used in a system according to the invention is shown in FIGS. 2a to 4b.

Figure 2A:
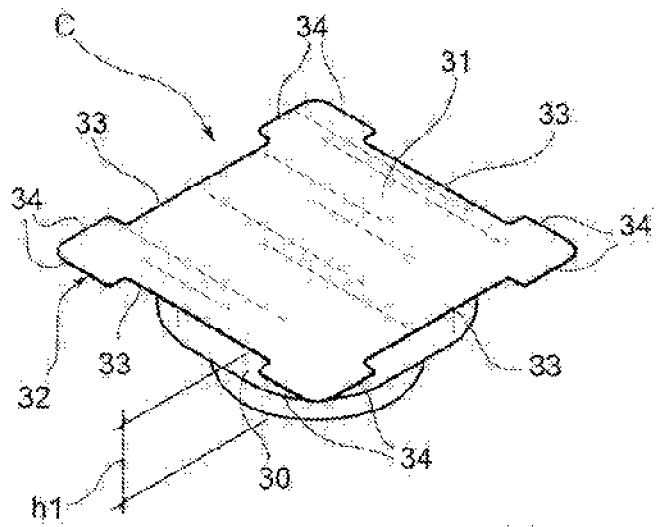
FIGS. 2a and 2b are perspective views of a first type of capsule and of the corresponding cup-shaped body, for use in a system according to the invention.

FIG. 2a shows a capsule C comprising a cup-shaped body 30 whose mouth is sealed by means of a cover 31. The cover 30 may be made, for example, of plastic material, of metal, or of a composite material, and may be made by moulding, by thermoforming, or by other known techniques.

Preferably, the material of the body 30, as well as the material of the cover 31, is selected so as to prevent or at least obstruct the penetration of moisture and oxygen into the capsule.

The cover 31 is applied in a sealed way to the body 30 in any of various known ways.

Figure 2B:
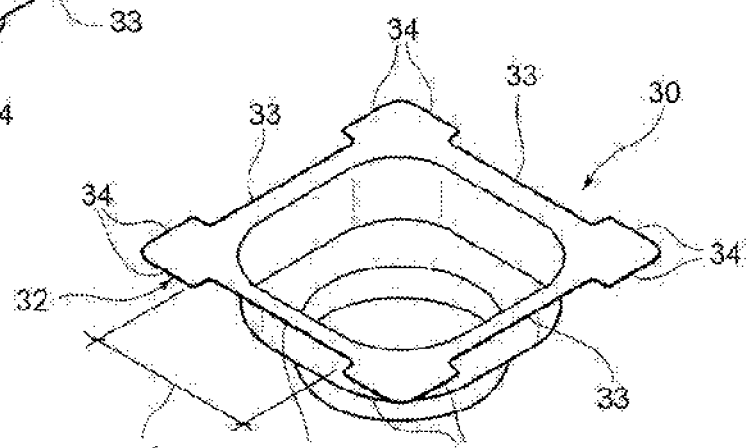

The capsule of FIG. 2a has a cup-shaped body 30 shown more fully in FIG. 2b. This body is provided with a top transverse flange 32 which, in the illustrated exemplary embodiment, is substantially quadrangular. Each of the four sides of the flange 32 has a respective intermediate indentation 33, the dimension of which in the perimetric direction, indicated by w1, is correlated in a one-to-one way with the height h1 of the capsule C, for the reasons that will become apparent below.

Although each capsule C in the illustrated embodiment has four perimetric indentations 33 in its transverse flange 32, it is sufficient for the purposes of the present invention for the flange of the capsule to have at least one indentation of this type.

Figure 3A:
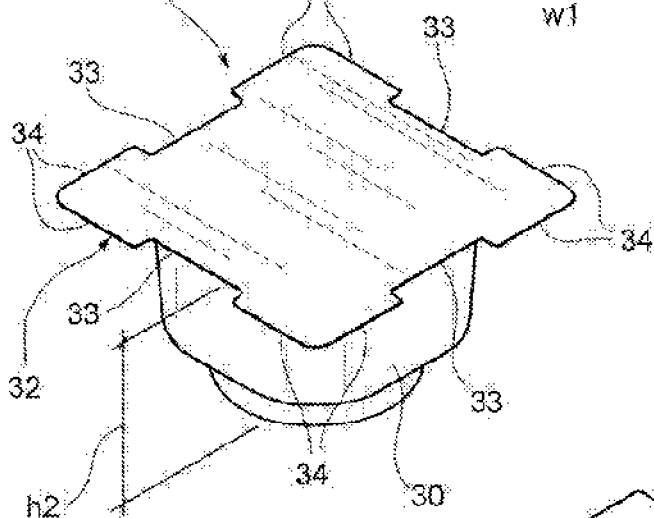
FIGS. 3a and 3b are perspective views of a second type of capsule and of the corresponding cup-shaped body.

FIG. 3a shows a capsule C of a second type, similar to the preceding type but characterized by an appreciably greater axial length h2. Correspondingly, the perimetric indentation or indentations 33 of the transverse flange of the capsule according to FIGS. 3a and 3b have a reduced perimetric dimension w2 which, in this case also, is correlated with the height h2, for the reasons that are illustrated below.

Figure 4A:
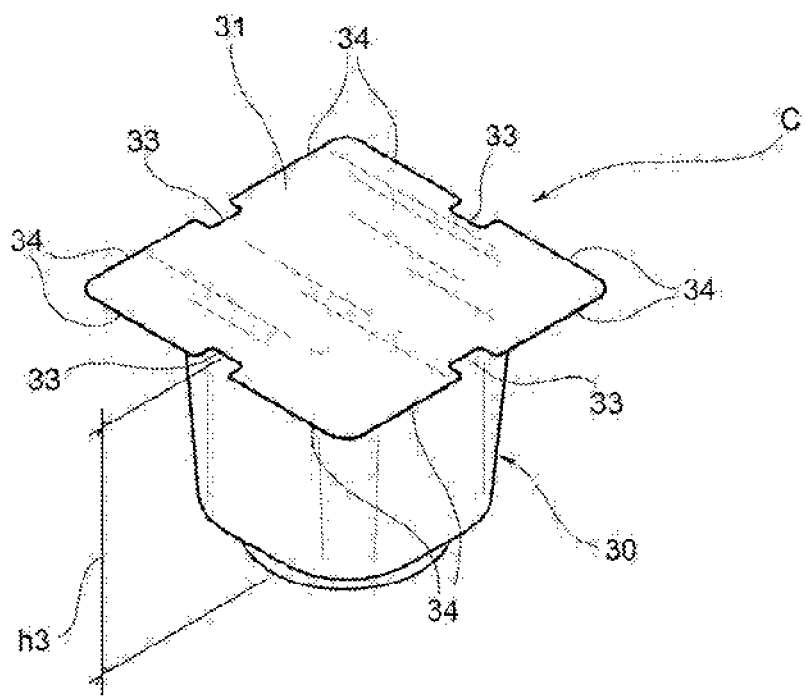
FIGS. 4a and 4b are perspective views of a third type of capsule and of the corresponding cup-shaped body.

FIG. 4a shows a capsule C of a further type, similar to the types described above.

Figure 3B:
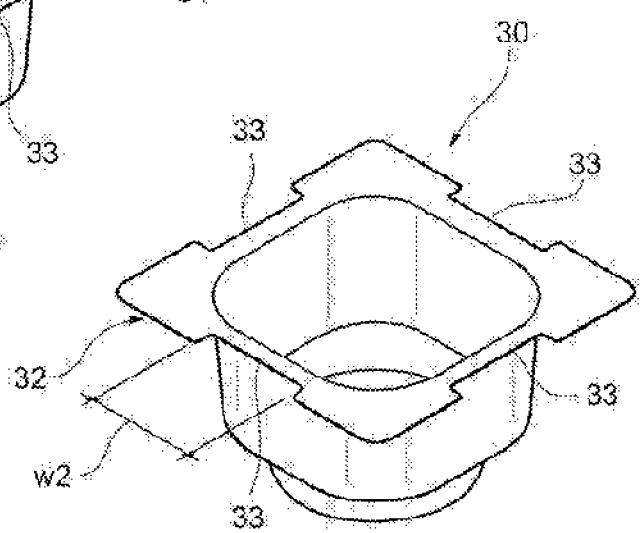
Figure 4B:
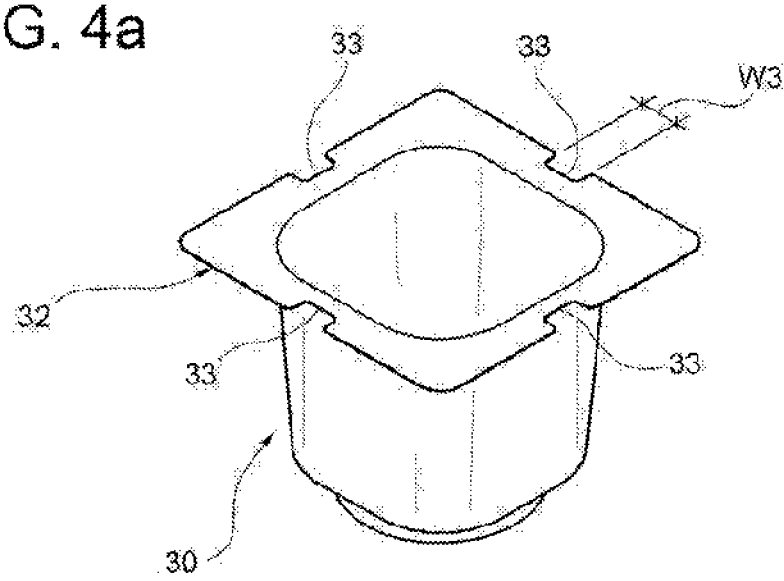

In the embodiment according to FIGS. 4a and 4b, the capsule C has an axial height or length h3 appreciably greater than that of the capsule according to FIGS. 3a and 3b. Correspondingly, in the capsule according to FIGS. 4a and 4b, the dimension in the perimetric direction w3 of the indentation or indentations 33 of the flange 32 is further reduced, and in all cases is correlated in a one-to-one way with the axial height or length h3 of this capsule.

In the capsules described above with reference to FIGS. 2a to 4b, at the end of each perimetric indentation 33 the flange 32 has two end portions 34 projecting transversely outwards. These projecting portions 34 make it possible to guide the capsule C introduced into the machine 1 partially described above, along the retaining and guiding device 20, as described more fully below.

Figure 10:
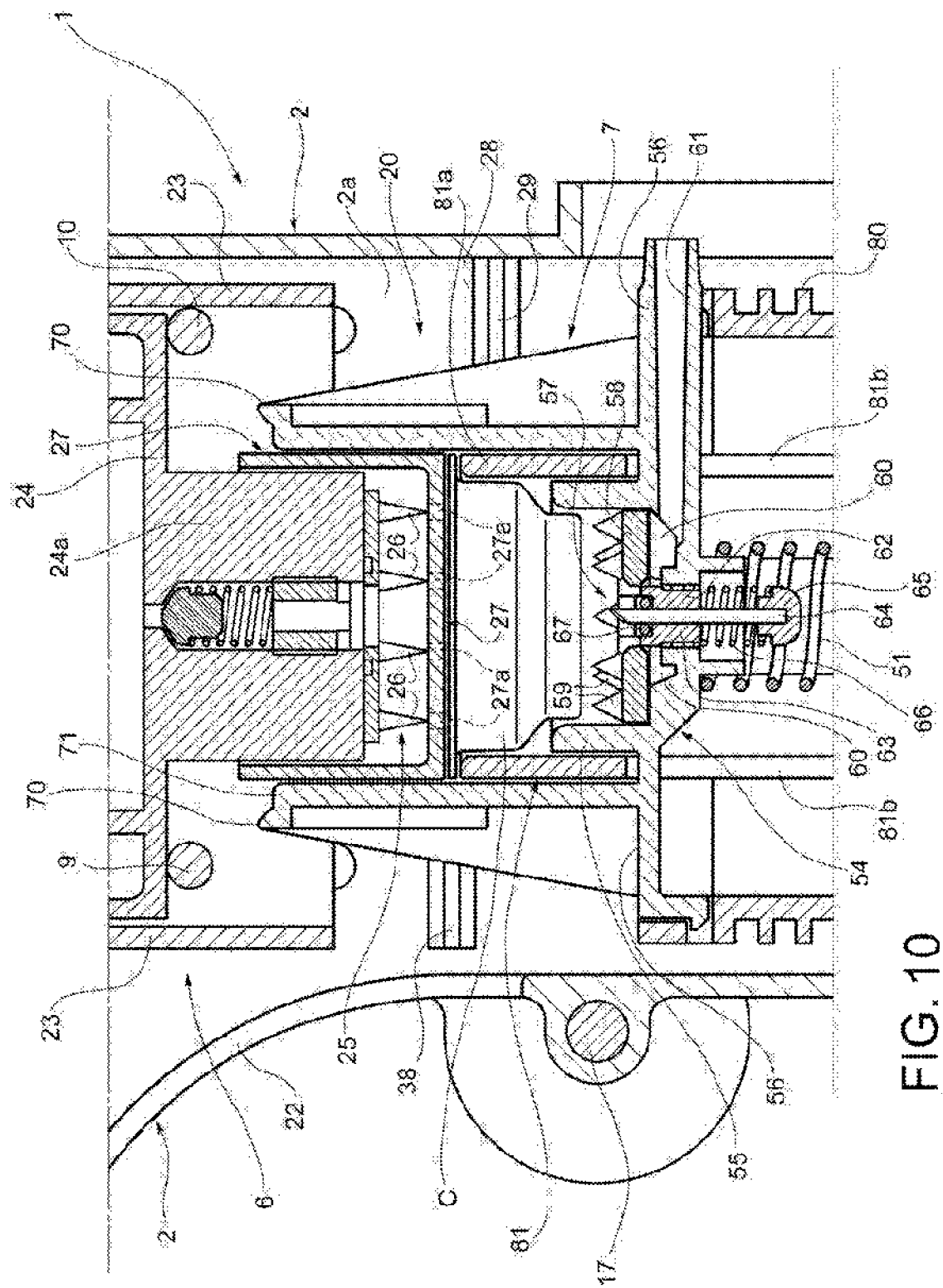
FIG. 10 is a partial sectional view and shows part of the machine according to FIGS. 1, 5, 7 and 9, in a different step of a beverage preparation cycle.

With reference, for example, to FIGS. 5 and 10, the hot water and/or steam injection head 6 essentially comprises a casing 23 in which a body 24 is fixed.

This body 24 has a protruding central formation 24a through which, in use, an axial flow of hot water and/or steam can be supplied in a known way, this flow being taken from a source which is also known, such as a boiler or a heat exchanger device of the type called "instantaneous".

At the distal end of the formation 24a of the body 24 there is fitted a perforator element 25, having a plurality of sharp points 26 adapted to puncture the cover 31 of a capsule C.

Around the distal end of the formation 24a of the body 24 there is mounted a point cover element 27 (see, in particular, FIG. 10), which is essentially cup-shaped and has a plurality of through holes 27a, each in line with a point 26 of the perforator device 25.

In a known way, resilient means are associated with the point cover element 27, these means tending to hold the element, relative to the formation 24a of the body 24, in such a position that the perforating points 26 do not protrude beyond its base surface via the through holes 27a.

Figure 6:
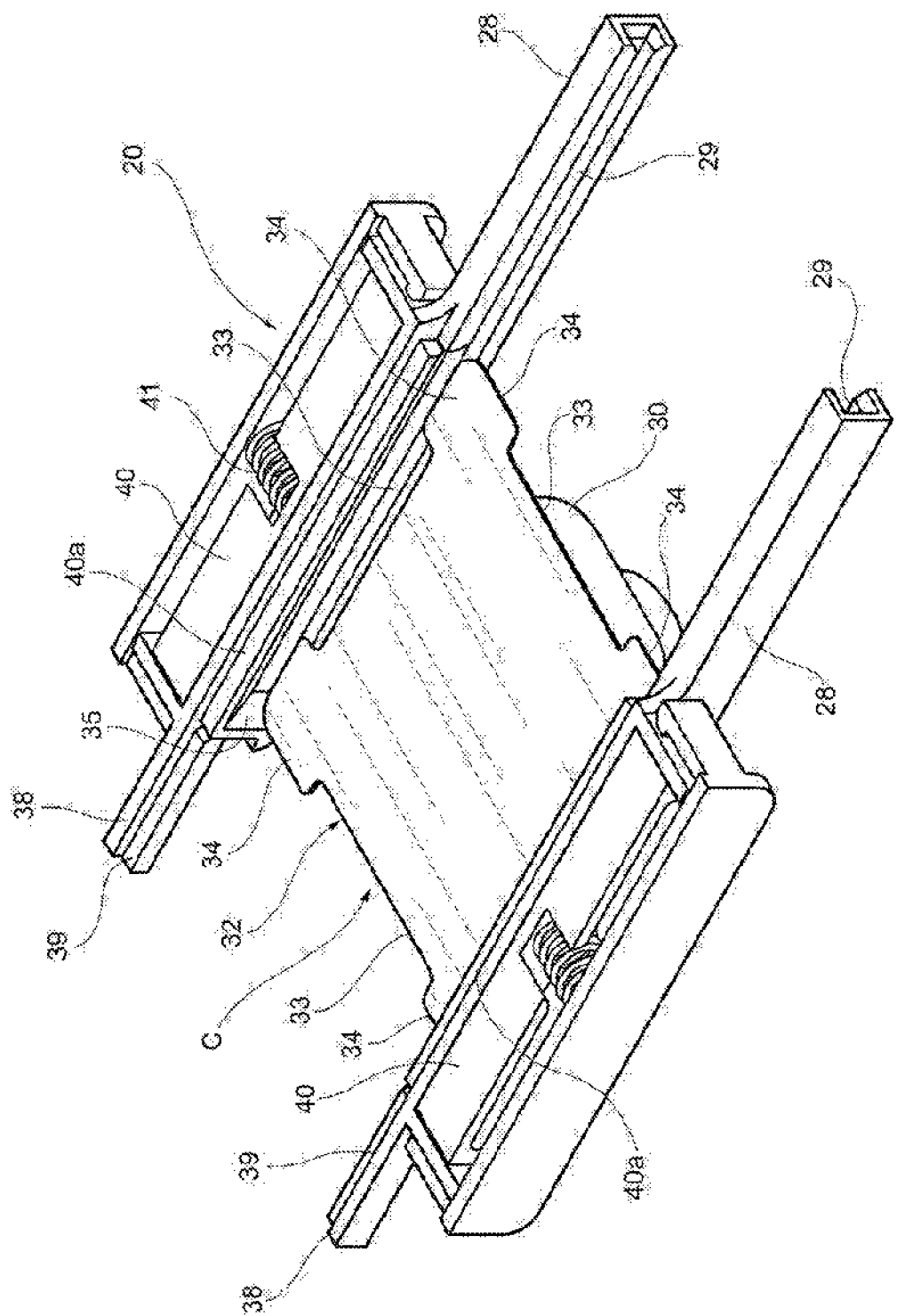
FIG. 6 is a partial perspective view showing an embodiment of a retaining and guiding device for introducing a capsule into a machine for the preparation of beverages according to the invention.

With reference to FIGS. 5, 6 and 10 for example, the retaining and guiding device 20 comprises a first pair of parallel facing guides, indicated by 28 (see, in particular, FIG. 6).

These guides 28 have a configuration with a C-shaped cross section, and form respective grooves 29, in which the protuberances 34 of two opposing sides of the flange 32 of a capsule C can be slidably engaged.

With reference to FIGS. 5 and 6, the ends of the guides 28 farther from the introduction opening 21 are associated with respective stop shoulders 35, only one of which is visible in FIG. 6, in order to stop in a predetermined position the flange 32 of a capsule C introduced into the machine 1 through said opening 21 and the guides 28.

The retaining and guiding device 20 further comprises a second pair of guides 38, facing and parallel to each other, staggered longitudinally with respect to the guides 28. The guides 38 are also staggered with respect to the guides 28 in a direction orthogonal to the plane defined by these guides 28.

The guides 38 are conveniently made in one piece with the guides 28, and also have respective facing grooves, indicated by 39 in FIG. 6.

The combination of guides 28 and 38 is fixed to the support casing 23 of the hot water and/or steam injection head 6.

In the area of longitudinal superimposition between the guides 28 and 38, in the lower walls or sides of the grooves 39 there are formed respective recesses through which there extend respective retaining members 40 which are movable transversely to these guides under the action of respective thrust springs 41.

The retaining members 40 have respective distal ends 40a which extend through corresponding openings formed in the bottom walls of the grooves 39 of the guides 38.

These ends 40a extend substantially flush with the lower walls or sides of the grooves 39.

The arrangement is such that the springs 41 normally tend to keep the ends 40a of the retaining members 40 at a distance from one another which is smaller than the transverse width of the flange 32 of a capsule C, measured at the outer edges of a pair of homologous protrusions 34.

The facing edges of the end portions 40a of the retaining members 40 are chamfered on oblique planes parallel to the guides 28 and 38. The planes of the chamfers of the edges of these retaining members 40 converge upwardly as seen by a viewer of FIG. 6.

The arrangement is such that, when a capsule C is introduced through the opening 21 of the machine 1, as shown in FIG. 5, with the flange 32 engaged in the grooves 29 of the guides 28, this capsule descends by gravity along these guides until its flange 32 bears on the stop surfaces 35 (FIG. 6).

In this condition, shown in FIG. 7, the capsule C is axially aligned with the hot water and/or steam supply head 6.

Figure 9:
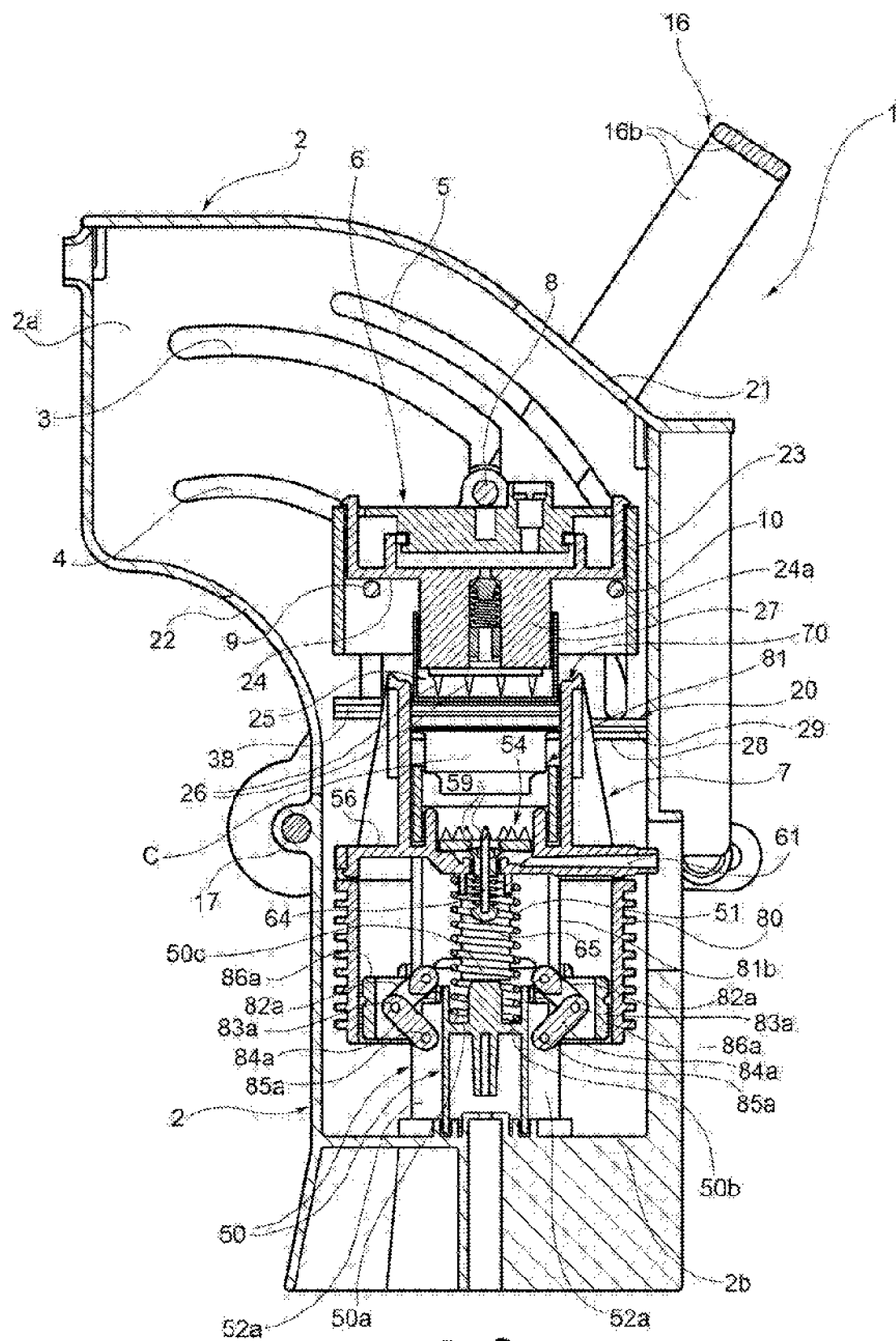
FIG. 9 is a view similar to that presented in FIG. 7, and shows another step of a beverage preparation cycle.

Starting from this condition, the operation of the control lever 16 by a user can cause a movement of the injection head 6, and of the retaining and guiding device 20 and the capsule C, towards the capsule carrier unit 7, as shown in FIGS. 9 and 10, for the purpose of preparing a beverage.

With reference to FIGS. 5, 7 and 8, in the illustrated exemplary embodiment the support casing 2 of the machine 1 has in its lower part a base 2b on which a central reaction element 50 is placed within said casing. This element 50 extends vertically from the base 2b upwards, and at its upper end forms an annular seat 50a housing the lower end of a coil spring 51. This spring 51 bears on an underlying annular shoulder 50b of the seat 50a.

Inside the support casing 2, around the reaction element 50, there extend upwards from the base 2b two first opposed vertical formations 52a (FIG. 7) and two second vertical formations 52b (FIG. 8) opposed to one another with respect to a vertical plane set at an angle to the plane of opposition of the formations 52a.

Figure 11:
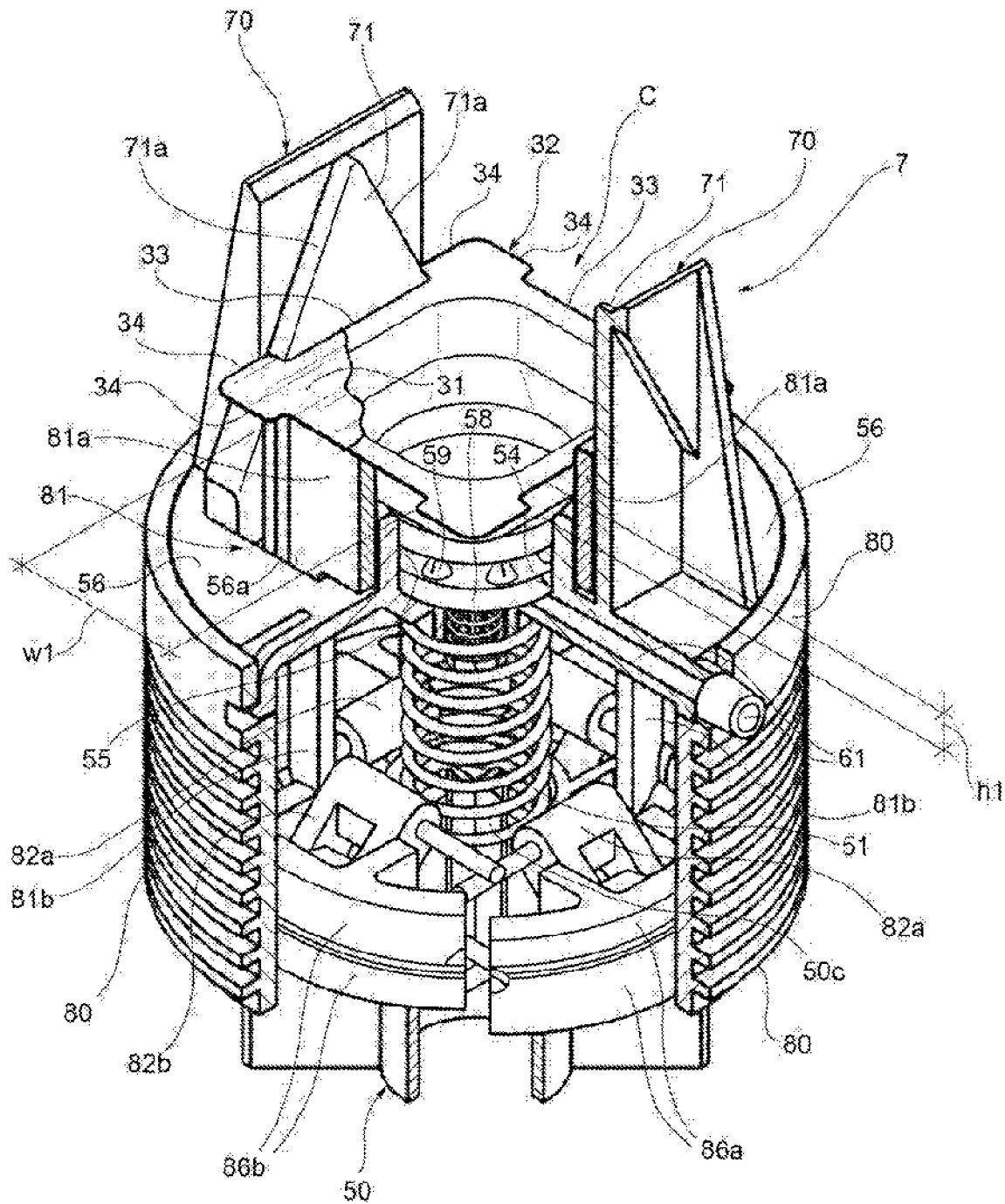
FIG. 11 is a partial perspective view, in partial section, of the brewing unit of the machine according to the preceding figures.

The capsule carrier unit 7 further comprises a receiving element 54 including an essentially cup-shaped central part 55, from which a kind of flange 56 extends radially outwards (see, for example, FIGS. 8 and 11).

As can be seen more clearly in FIGS. 8 and 10, a perforation device, indicated as a whole by 57, intended to perforate the bottom wall of a capsule C, is placed on the bottom of the central portion 55 of the receiving element 54.

In the illustrated exemplary embodiment, the perforation device 57 comprises an annular plate 58 having on its upper side a plurality of sharp points 59, with respective slots 60. The beverage brewed in a capsule C can pass through the slots of said points to an outlet region 60 (FIG. 10) of the receiving element 54, to be directed to a collecting vessel such as a glass or cup, through a conduit 61 formed integrally with the flange 56 of the receiving element 54 (see FIG. 10 in particular).

The bottom wall of the central portion 55 of the receiving element 54 has an opening 62 in which is fixed an essentially tubular guide element 63, through which a perforating needle or pin 64 is mounted so as to be axially translatable in a vertical direction.

The lower end of the perforating pin 64 is fixed to a head 65 against which the lower end of a spring 66 reacts, the upper end of the spring reacting against the lower end of the guide element 63.

The upper end of the perforating pin 64 extending above the guide element 63 has a stop ring 67 fixed to it, this ring preventing the downward movement of the perforating pin under the action of the spring 66.

The arrangement is such that, in the rest condition of the perforation device, shown in FIGS. 8 and 10 in particular, the upper end of the perforating pin 64 is at a level vertically below the plane of the terminal cusps of the perforation points 59. The spring 66 tends to hold the perforating pin 64 in this condition.

Again with particular reference to FIG. 10, the perforating pin 64 and the spring 66 extend axially inside the spring 51.

In this rest condition, the head 65 of the perforating pin 64 extends in a vertically facing relationship with a central protuberance 50c of the reaction element 50, while being spaced apart from this protuberance to some extent, as seen, for example, in FIG. 8.

With reference to FIGS. 5 and 11 in particular, two essentially planar appendages 70, facing one another horizontally, extend vertically upwards from the flange 56 of the receiving element 54.

As seen, for example, in FIG. 10, the appendages 70 extend transversely outwards and are spaced apart from the cup-shaped central portion 55 of the receiving element 54.

Figure 14:
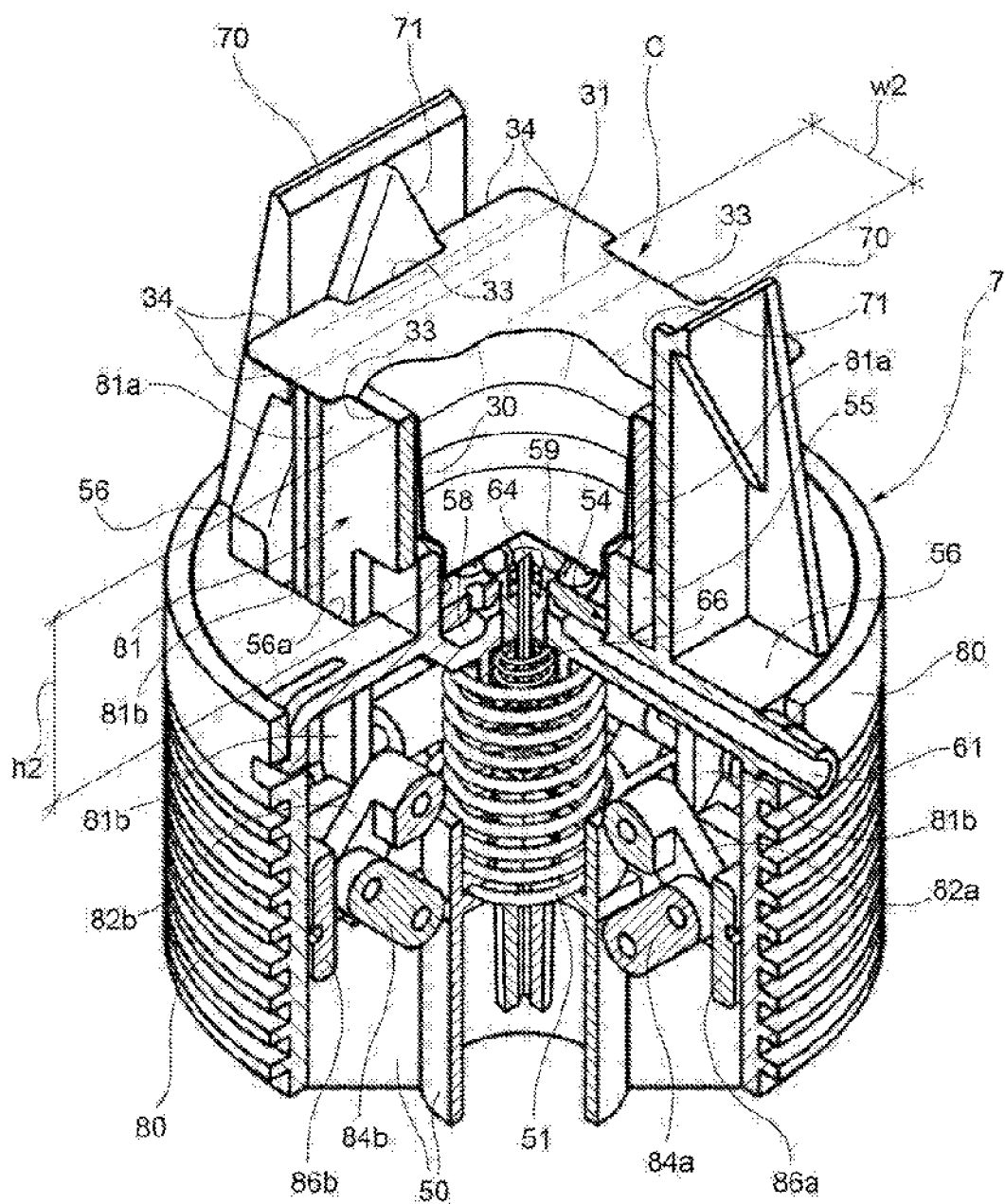
FIGS. 14 to 15 are perspective views similar to that presented in FIG. 11, and show the use of the brewing unit of this figure with capsules of other types.
Figure 15:
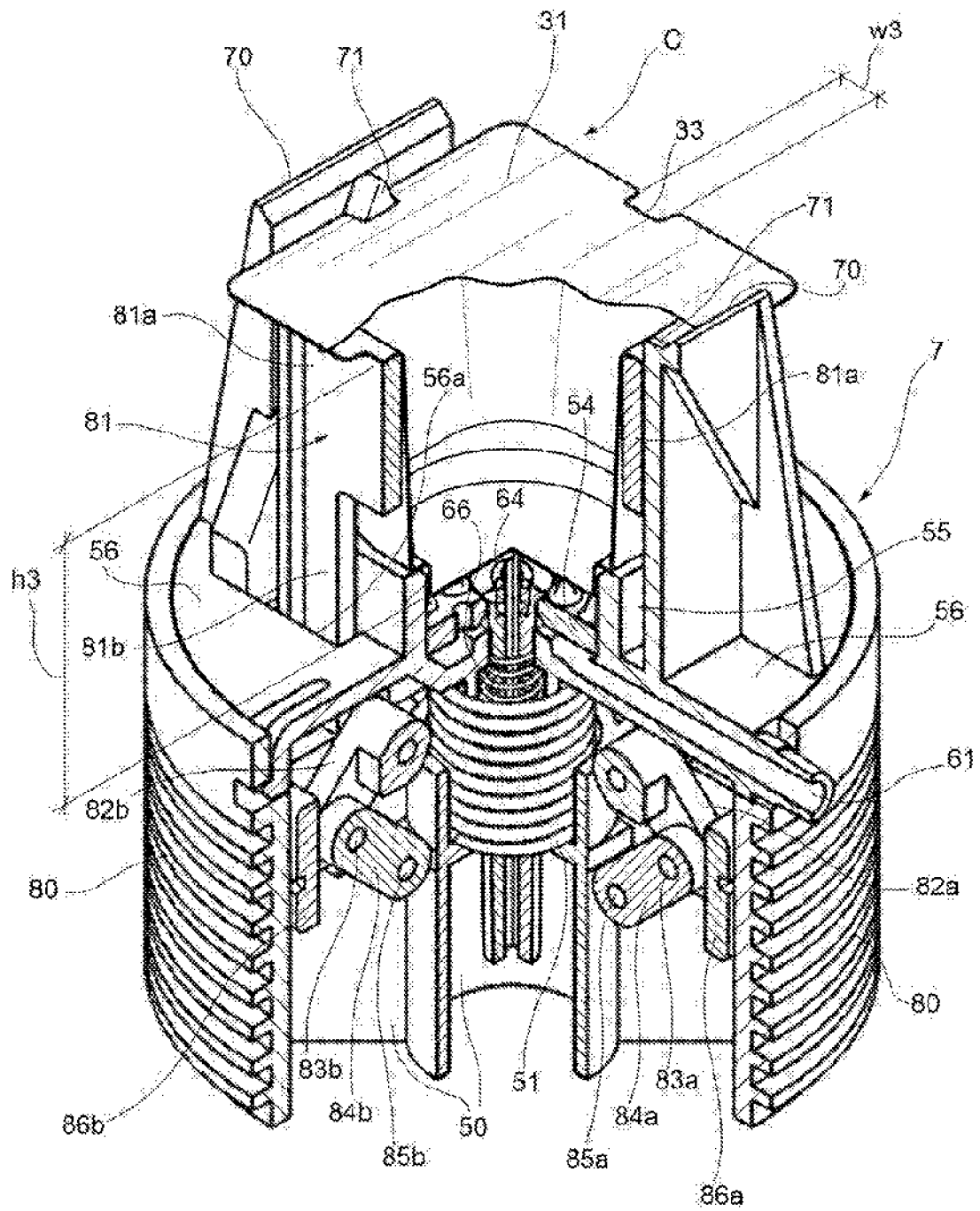

With reference to FIGS. 11, 14 and 15 in particular, respective projecting formations 71, essentially in the shape of isosceles triangles, the oblique sides of which are indicated by 71a, extend from the frontally facing surfaces of the appendages 70 (see FIG. 11 in particular).

As will be more clearly apparent from the following text, for the purpose of preparing a beverage a capsule C is transferred, by means of the injection unit 6 and the associated retaining and guiding device 20, towards the capsule carrier unit 7, and in particular is introduced vertically between the appendages 70 of the receiving element 54.

The arrangement of these appendages 70 is such that two opposed indentations 33 of the flange 32 of a capsule C of this type are initially coupled to, and slide along, the oblique sides 71a of the projecting formations 71 of said appendages 70.

FIG. 11 shows the capsule carrier unit 7 in which a capsule of the type shown in FIGS. 2a and 2b is positioned, the indentations 33 of the flange of this capsule having a considerable width w1. Similarly, FIGS. 14 and 15 show the capsule carrier unit 7 in which capsules of the type shown in FIGS. 3a, 3b and in FIGS. 4a, 4b, respectively, are positioned between the appendages 70.

Because of the greater width w1 of the indentations 33 of the flange of the capsule shown in FIGS. 2a and 2b, this type of capsule can penetrate farther between the appendages 70 of the capsule carrier unit 7, before its projecting formations 34 bear on and are stopped by the oblique sides 71a of the projecting formations 71.

Correspondingly, a capsule of the type shown in FIGS. 4a and 4b, whose flange indentations 33 have the minimum width w3, bears on the oblique sides 71a of the formations 71 near the top of the appendages 70, as shown in FIG. 15.

Again with reference to FIGS. 8 and 10, a cylindrical annular element 80 with a smooth inner wall is fixed to the periphery of the flange 56 of the receiving element 54. This annular element 80, together with the flange 56, forms a kind of drum, the functions of which are described below.

In the capsule carrier unit 7, the receiving element 54 is associated with a lateral delimiting element, indicated as a whole by 81.

In the illustrated exemplary embodiment, the delimiting element 81 has an upper portion 81a of essentially tubular shape, with a substantially quadrangular cross section (see, for example, FIGS. 8, 10 and 11), extending between the central portion 55 of the receiving element 54 and the appendages 70 described above.

The portion 81a of the element 81 has a plurality of longitudinal appendages 81b, which pass through corresponding openings 56a (FIGS. 11, 14 and 15) provided in the flange 56 of the receiving element 54.

As can be seen, for example, in FIG. 8, the lower ends of the appendages 81b of the delimiting element 81 extend inside the annular element 80.

In the illustrated embodiment, the delimiting element 81 has four appendages 81b, arranged in pairs opposed to one another about the spring 51.

As can be seen, for example, in FIG. 9, the lower ends of a first pair of opposed appendages 81b of the delimiting element 81 have respective links 82a pivoted on them, these links in turn being pivoted at 83a on corresponding cranks 84a, which are rotatable about respective horizontal axes 85a, fixed relative to the formations 52a, which protrude from the base 2b of the support casing 2.

Similarly, as can be seen in FIG. 8, the lower ends of the other two longitudinal appendages 81b have respective links 82b pivoted on them, these links in turn being pivoted at 83b on corresponding cranks 84b, which are rotatable about respective horizontal axes 85b, relative to the formations 52b of the base 2b of the casing 2 (see also FIGS. 11, 14 and 15).

The links 82a, 82b and the associated cranks 84a, 84b form toggle mechanisms between the formations 52a, 52b of the base of the support casing and the longitudinal appendages 81b of the lateral delimiting element 81.

The intermediate pivot pins 83a and 83b are connected to respective brake blocks 86a, 86b intended to interact with the drum formed by the annular element 80 and the flange 56 of the receiving element 54.

The system for the preparation of beverages described above with reference to FIGS. 1 to 16 operates essentially in the following manner.

The user selects a type of capsule from those specified for use with the machine 1 described above.

It will be assumed initially that the user selects a capsule C of the type shown in FIGS. 2a and 2b.

The selected capsule C is introduced into the machine 1 through the opening 21 of the latter.

As shown in FIG. 1, the general shape of this opening 21 is essentially in the form of a letter T, with two top transverse portions for the passage of the projecting portions 34 of the flange 32 of the capsule C.

Said projecting portions 34 of the flange 32 of the capsule engage in the grooves 29 of the guides 28 of the retaining and guiding device 20, and slide downwards along said guides, by gravity, from the introduction position shown in FIG. 5 to the position shown in FIG. 7 in which the flange 32 bears against the stop surfaces 35 (FIG. 6).

In these conditions, the capsule carrier unit 7 is in the rest condition shown, for example, in FIGS. 7 and 8: the receiving element 54 is held by the spring 51 in the illustrated condition, in which the flange 56 bears against stop formations 2c of the support casing 2, and the lateral delimiting element 81 (the portion 81a of which bears on said flange 56) holds the brake blocks 86a, 86b, by means of the toggle mechanism 82a, 85a and 82b, 85b, in a position spaced apart horizontally from the inner surface of the annular element 80.

The central portion 55 of the receiving element 54 and the upper portion 81a of the delimiting element 81 are adapted to define, in combination, a variable-volume brewing chamber, indicated by 100 in the drawings: the portion 81a of the element 81 acts as a lateral delimiting part of this chamber, while the portion 55 of the receiving element 54 acts as an end delimiting part of said chamber, and is axially slidable relative to the portion 81a, as described further below.

After a capsule C has been introduced into the machine 1 and has reached the position of FIG. 7 as described above, the user can operate the control lever 16, causing it to rotate about the axis 17, in a clockwise direction as seen by a viewer of FIG. 7.

The injection head 6 and the associated retaining and guiding device 20, with the capsule C positioned therein, are then moved along a trajectory defined by the slots 3, 4 and 5 of the support casing 2.

During this movement, the combination formed by the injection head 6, the retaining and guiding device 20 and the capsule C reaches the intermediate position shown in FIG. 9, in which the guide pins 8, 9 and 10 are engaged in the straight vertical portions of the slots 3, 4 and 5.

In this condition, the indentations 33 of two opposed sides of the flange 32 of the capsule slide along the projecting formations 71 of the appendages 70 of the receiving element 54, which remains stationary in the rest condition described above.

As soon as the protuberances 34 of the flange of the capsule C begin to interfere with the oblique sides of the projecting formations 71, the capsule C starts to drag the receiving element 54 downwards, while the delimiting element 81 remains axially immobile, in the rest position, until the flange 32 of the capsule C bears against the top edge of its upper portion 81a.

The further rotation of the control lever 16 causes a further lowering of the combination formed by the injection head 6, the retaining and guiding device 20 and the capsule C, as a result of which the delimiting element 81 now also descends and, by means of its appendages 81b, operates the toggle mechanisms 82a, 85a and 82b, 85b, causing the brake blocks 86a, 86b to move apart and engage the inner surface of the ring 80.

When the brake blocks 86a, 86b have come to bear against the inner surface of the ring 80, this ring and the whole receiving element 54 become axially fixed with respect to the delimiting element 81.

Further operation of the control lever 16 now causes a further lowering of the injection head 6 and of the retaining and guiding device 20, while the capsule C is immobilized, bearing on the top edge of the delimiting element 81.

This relative movement causes the protuberances 34 of the flange of the capsule C, which have hitherto been engaged in the grooves 29 of the guides 28, to interfere with the edge portions 40a of the retaining members 40 (FIG. 6) and to be positioned above these edge portions 40a, inside the grooves 39 of the pair of guides 38 (FIG. 10).

The further descent of the injection head 6 causes the points 26 to emerge via the through holes 27a of the point cover 27, towards and then through the cover 31 of the capsule C. This results in the condition shown in FIG. 12.

In this condition, a flow of hot water and/or steam is then injected into the capsule C, the body 30 of which expands so that its bottom wall is punctured by the points 59 of the perforation device 57 carried by the receiving unit 54.

The beverage made by brewing and percolation through the capsule C can thus reach the conduit 61, and is then collected, in a way which is not illustrated, in a collecting vessel such as a cup or glass.

When the beverage has been dispensed, the reverse operation of the control lever 16 causes the elevation of the combination formed by the injection head 6, the retaining and guiding device 20, and the spent capsule C, which is now engaged in the grooves 39 of the upper guides 38.

Figure 13:
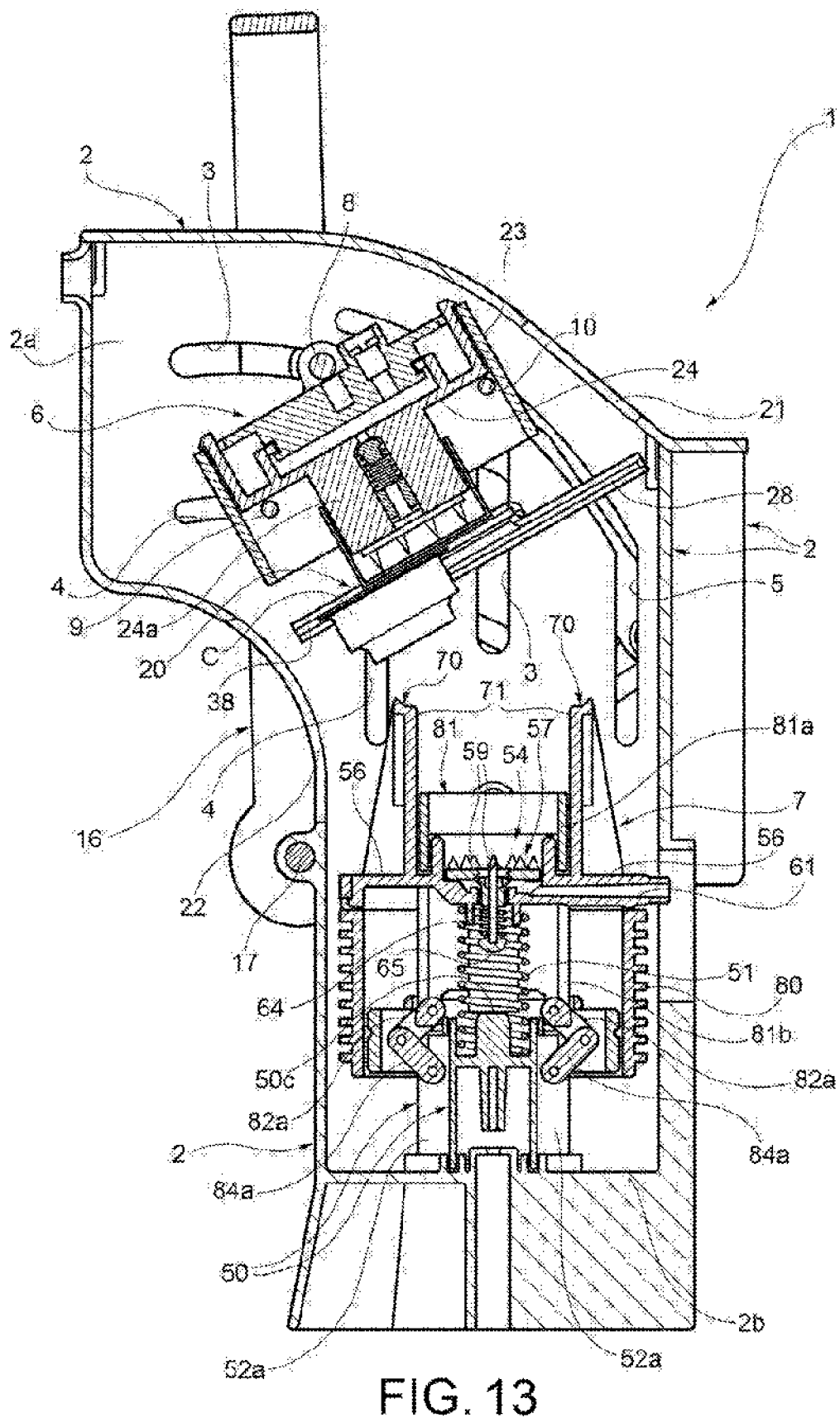
FIG. 13 is a view similar to that presented in FIG. 12, and shows a step of removal of a capsule after the preparation of a beverage.

In the terminal part of the return travel towards the original rest position, as soon as the inclination of said guides 38 is sufficient the spent capsule C can be discharged and removed by gravity through the opening 22 provided in the support casing 2 (FIG. 13).

If the spent capsule remains "stuck" to the guides 38, it will be removed subsequently by the force exerted on it by the new capsule introduced into the machine.

The operation of the system described above takes place in a similar manner if, in place of a capsule C as shown in FIGS. 2a, 2b, a capsule C of the type shown in FIGS. 3a, 3b or as shown in FIGS. 4a, 4b is used.

With a capsule C of the latter two types, the interaction between the indentations 33 and protrusions 34 of the flange 32 and the projecting formations 71 of the appendages 70 of the capsule carrier unit 7 again causes the capsule C in use to be placed, relative to the receiving element 54, in a predetermined axial position, in which the bottom wall of the capsule is located at a predetermined minimum height above the points 59 of the perforation device 57.

Figure 16:
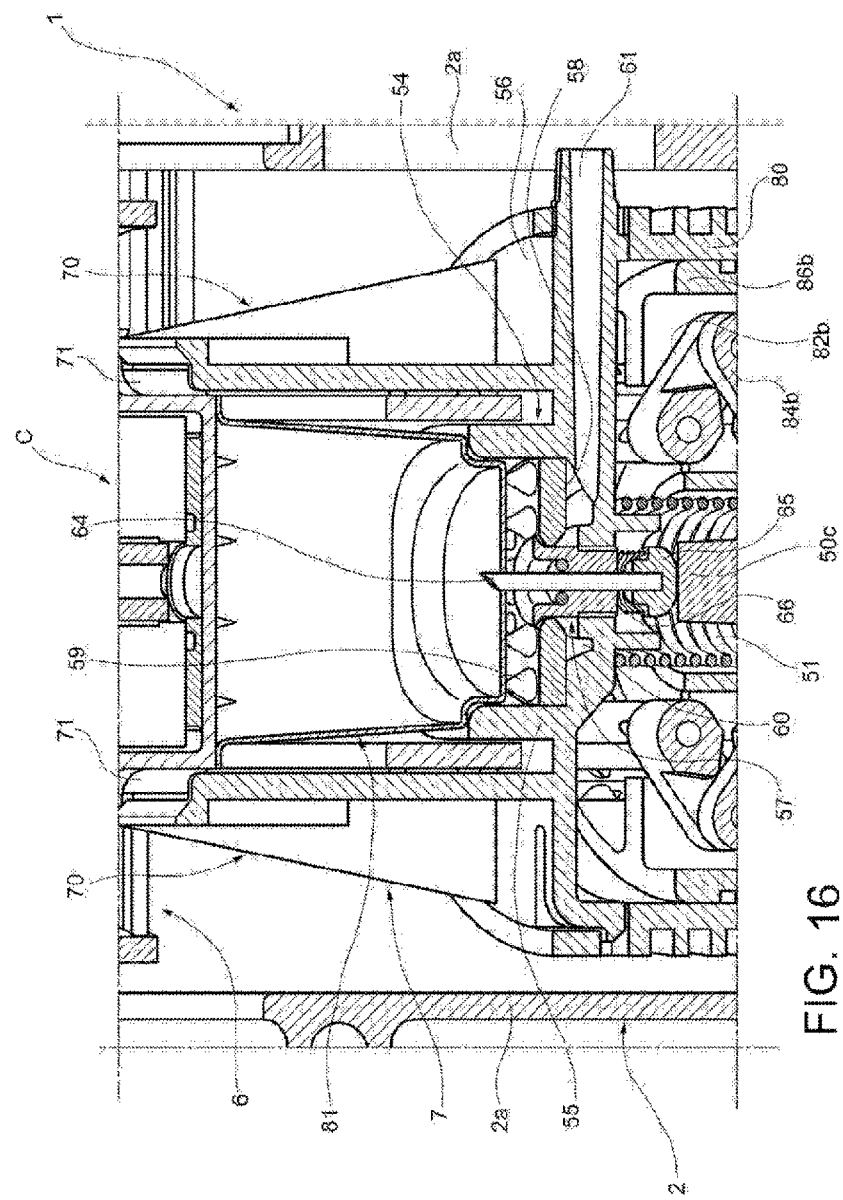
FIG. 16 is a view similar to that presented in FIG. 10, and shows the perforation of the bottom of a capsule having large dimensions.

In the case of higher-volume capsules C, of the type shown in FIGS. 4a and 4b for example, the bottom wall of the body 30 of the capsule can conveniently be perforated by means of the perforating pin or needle 64 which, as shown in FIG. 16, having come to bear against the stationary formation 50c, penetrates through the bottom wall of the body of a capsule C of this type.

The system described up to this point can operate with capsules having outwardly projecting transverse flanges, having substantially equal general dimensions, provided with indentations having different dimensions according to the type of capsule, and in particular according to the axial length or height of the capsules.

Figure 17A:
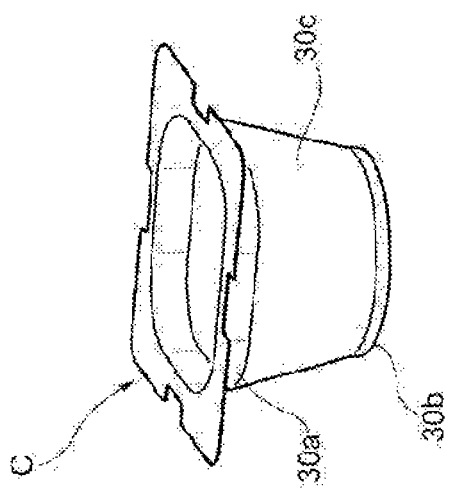
FIGS. 17a-17f are perspective views showing variant embodiments of the cup-shaped body of capsules that can be used in a system according to the present invention.
Figure 17B:
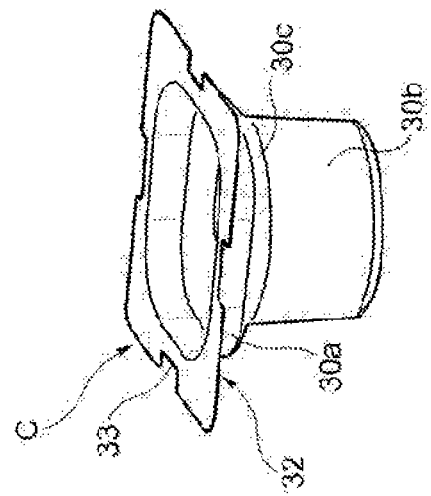
Figure 17C:
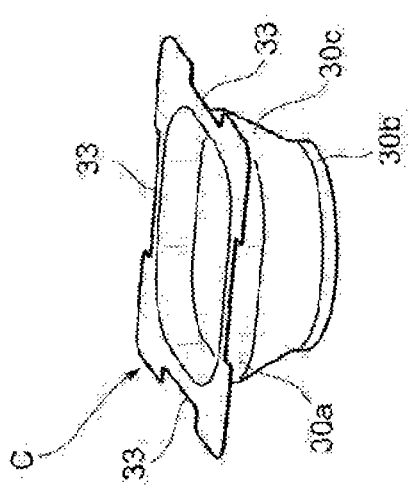

FIGS. 17a, 17b and 17c show specimens 30 of three types of capsule C that can be used in this system, these types of capsule differing not only in the perimetric dimensions of the respective flange indentations 33 but also in the shape of the lateral walls of their bodies 30.

In particular, the capsule bodies of FIGS. 17a-17c have an upper lateral wall portion 30a, of the same axial length or height, a lower lateral surface portion 30b, also of the same axial length or height, and an intermediate lateral surface portion 30c having a different axial length or height in each of the three types of capsule.

The intermediate portions of lateral wall 30c have, for example, a frustoconical shape.

Figure 17D:
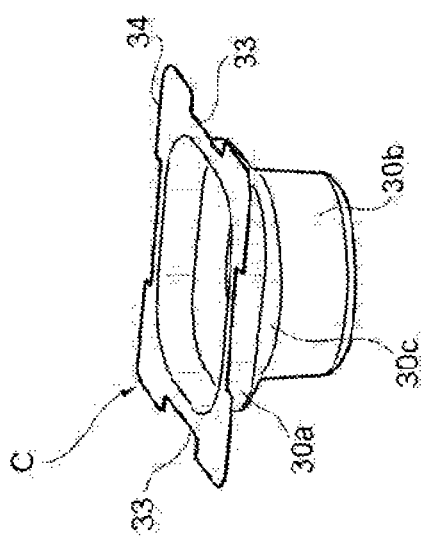
Figure 17E:
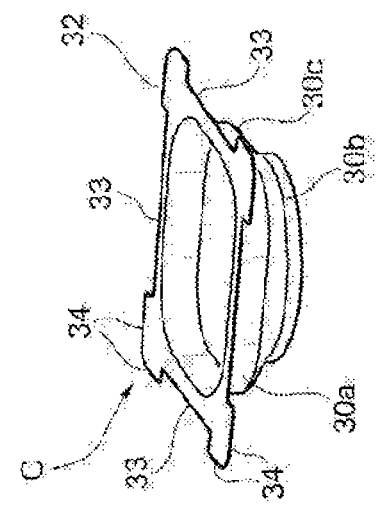
Figure 17F:
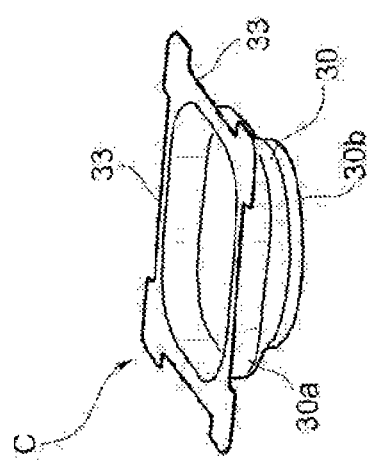

FIGS. 17d-17f show the bodies of another three types of capsules suitable for use in a system of the type described above.

In these types of capsule, the lateral wall of the cup-shaped body 30 has an upper portion 30a, which is cylindrical for example, having the same axial length or height in the three types of capsule, followed by an intermediate portion 30c, which is frustoconical for example, also having the same axial length or height in the three types of capsule, and a lower lateral surface portion 30b, which is cylindrical for example, having a different axial length or height in each of the three types of capsule.

The embodiments shown in FIGS. 17a to 17f are purely exemplary, and numerous variants could easily be devised.

FIGS. 18a to 20b show further variant embodiments of capsules C suitable for use in a system for the preparation of beverages according to the present invention.

The capsules shown in these figures are similar to those described above with reference to FIGS. 2a to 4b and 17a to 17f.

The capsules shown in FIGS. 18a to 20b essentially differ from those described above in that an indentation 33 is placed in an end portion of at least one side of the flange 32.

Figure 18A:
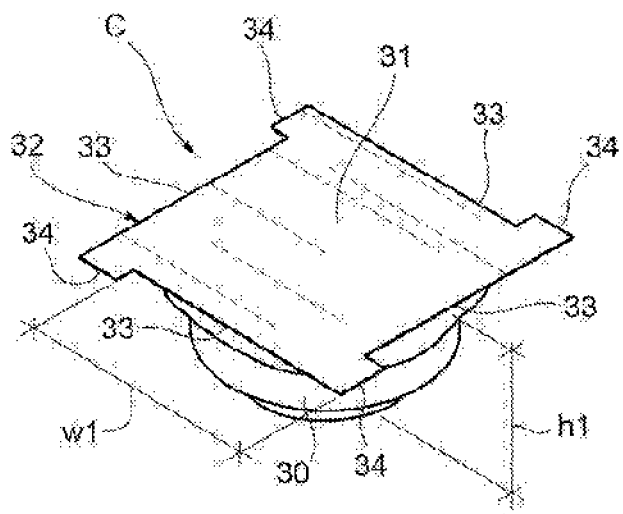
FIGS. 18a and 18b are perspective views of a further type of capsule and of the corresponding cup-shaped body, for use in a system according to the invention.
Figure 18B:
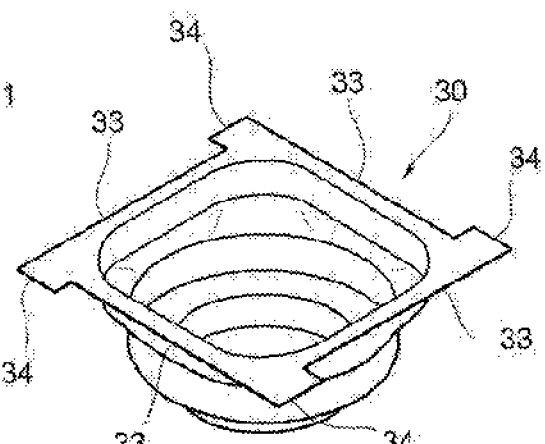

In the capsule of the type shown in FIGS. 18a and 18b, the four sides of the flange 32 of the capsule C each have a respective indentation 33 having a perimetric dimension w1, such that an end protrusion indicated by 34 is formed on each side.

In this case also, the dimension w1 of each indentation 33 of the flange of the capsule C is correlated with the axial length or height h1 of the capsule.

Figure 19A:
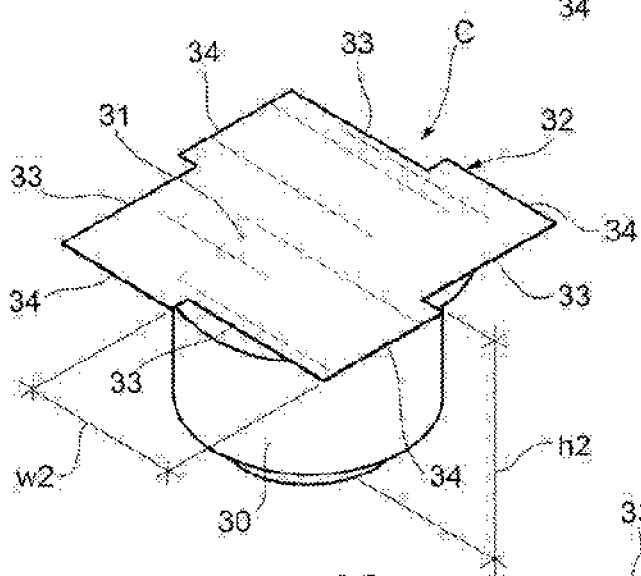
FIGS. 19a and 19b are perspective views of another type of capsule and of the corresponding cup-shaped body.
Figure 19B:
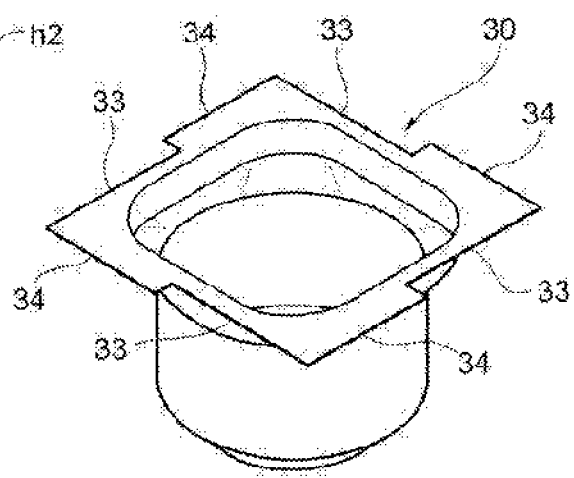

In the capsule of the type shown in FIGS. 19a and 19b, each side of the flange 32 of the capsule C has an indentation having a reduced perimetric dimension w2, correlated with the height h2 of the capsule, which, conversely, is increased.

Figure 20A:
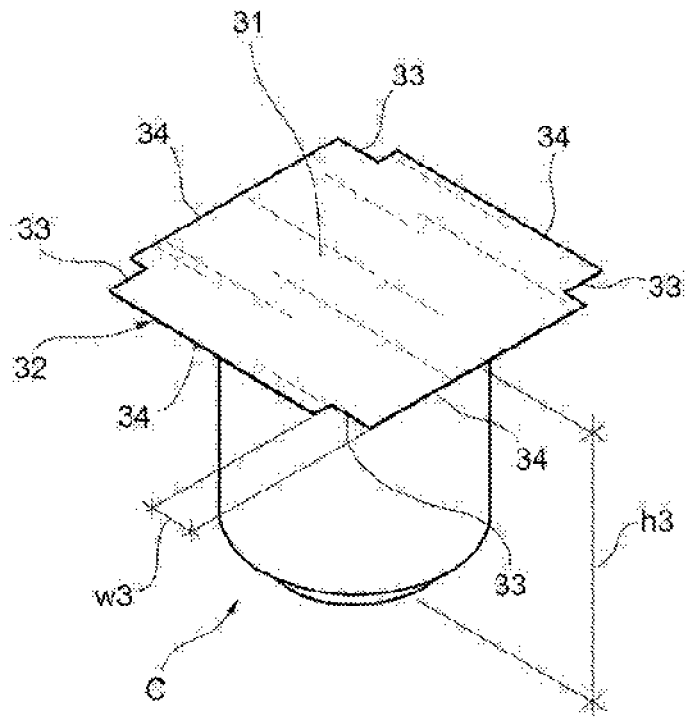
FIGS. 20a and 20b are perspective views of yet another type of capsule and of the corresponding cup-shaped body.
Figure 20B:
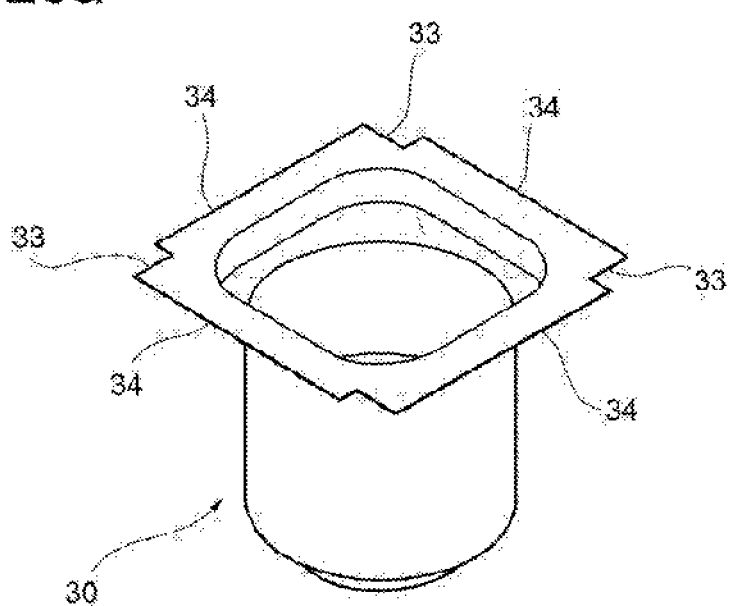

Finally, in the capsule of the type shown in FIGS. 20a and 20b, each side of the flange 32 has a respective indentation having a markedly reduced dimension w3, correlated in a one-to-one way with the height h3 of the capsule, which, conversely, is markedly increased. The capsules of the types shown in FIGS. 18a to 20b can be used in a machine similar to that described above with reference to FIGS. 1 to 16.

FIGS. 21 to 24 show, in particular, a capsule carrier unit 7 that can be used with capsules of the types shown in FIGS. 18a to 20b.

In FIGS. 21 to 24, parts and elements identical or substantially equivalent to parts and elements described previously have been given the same alphanumeric references as those used previously.

Briefly, the capsule carrier unit of FIGS. 21 to 24 essentially comprises a receiving element 54 with a central portion 55 slidable inside the upper part 81a of a lateral delimiting element 81. The latter has a pair of diagonally opposed columns 81b, which pass through corresponding openings provided in a flange part 56 of the receiving element 54.

As in the capsule carrier unit described previously, the capsule carrier unit 7 of FIGS. 21 to 24 carries, in its central part 55, a perforation device 57, including a plurality of perforated sharp points 59, and a needle or pin 64 having a head 65 on its lower part. This needle or pin, as before, is preferably intended to cause the central perforation of the bottom wall of a capsule C of the type shown in FIGS. 20a and 20b, that is to say a capsule having a greater axial length or height.

Figure 21:
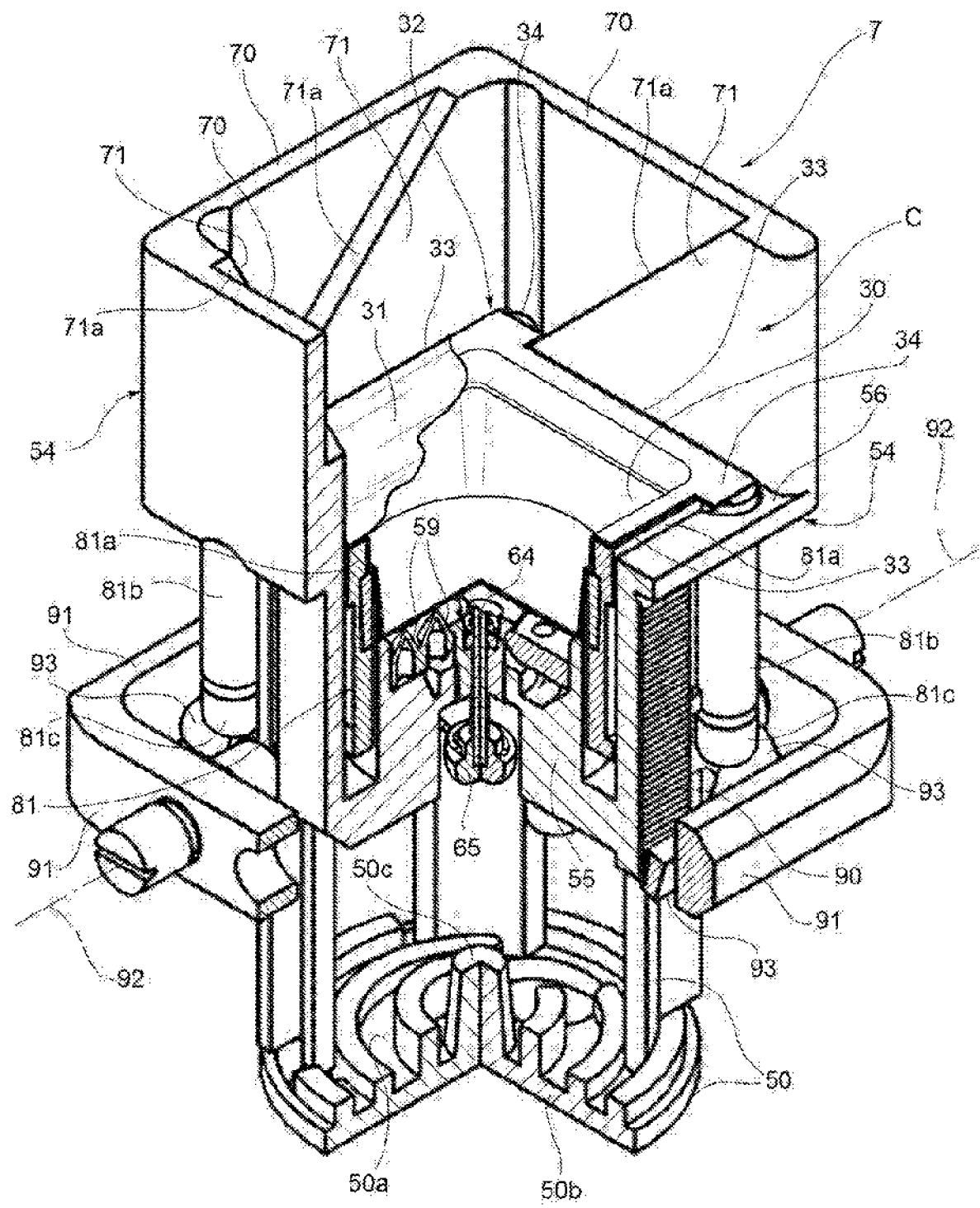
FIGS. 21, 22 and 23 are perspective views of another brewing unit that can be used in a machine according to the invention, for the use of capsules of the types shown in FIGS. 18a to 20b.
Figure 22:
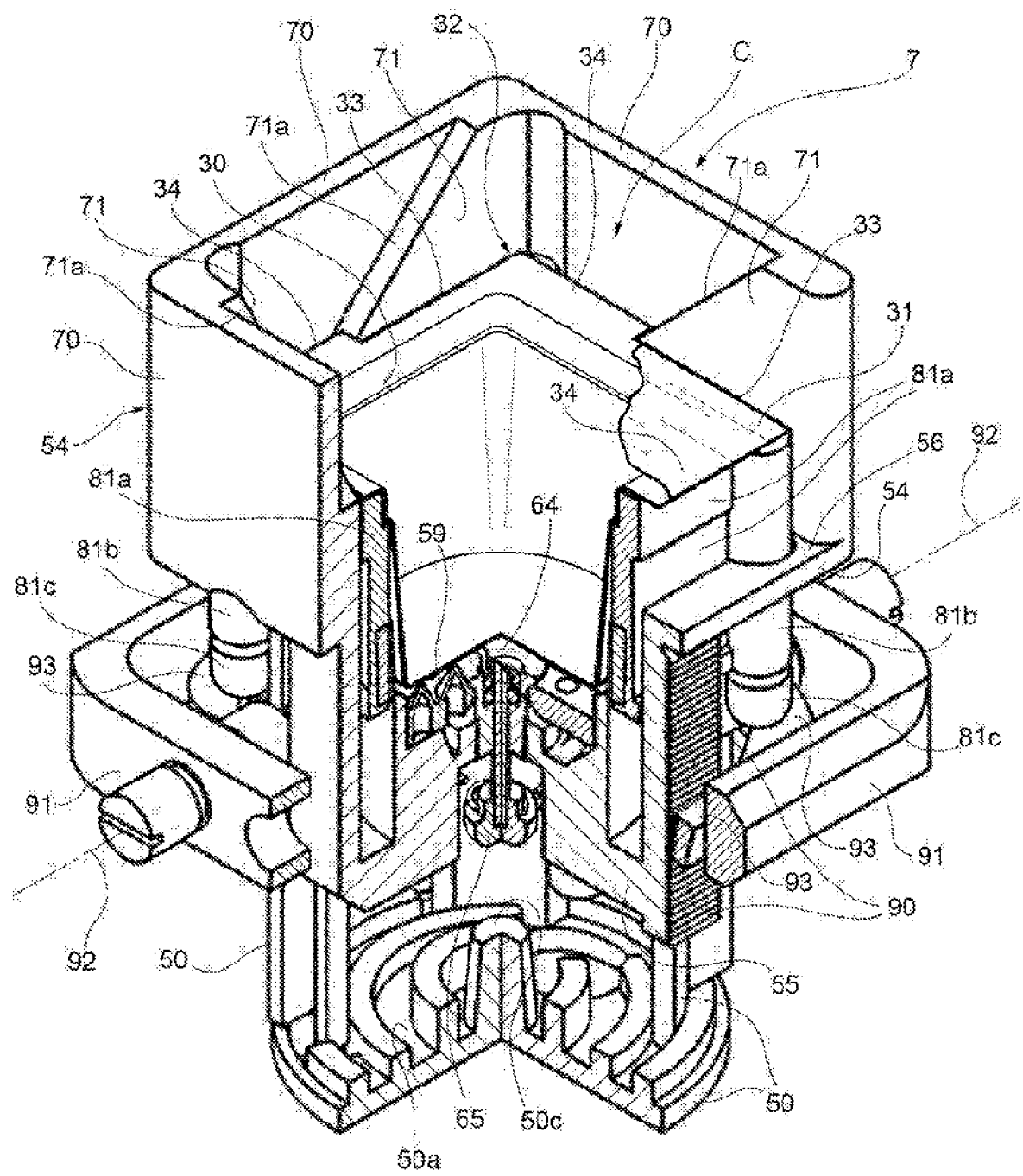
Figure 23:
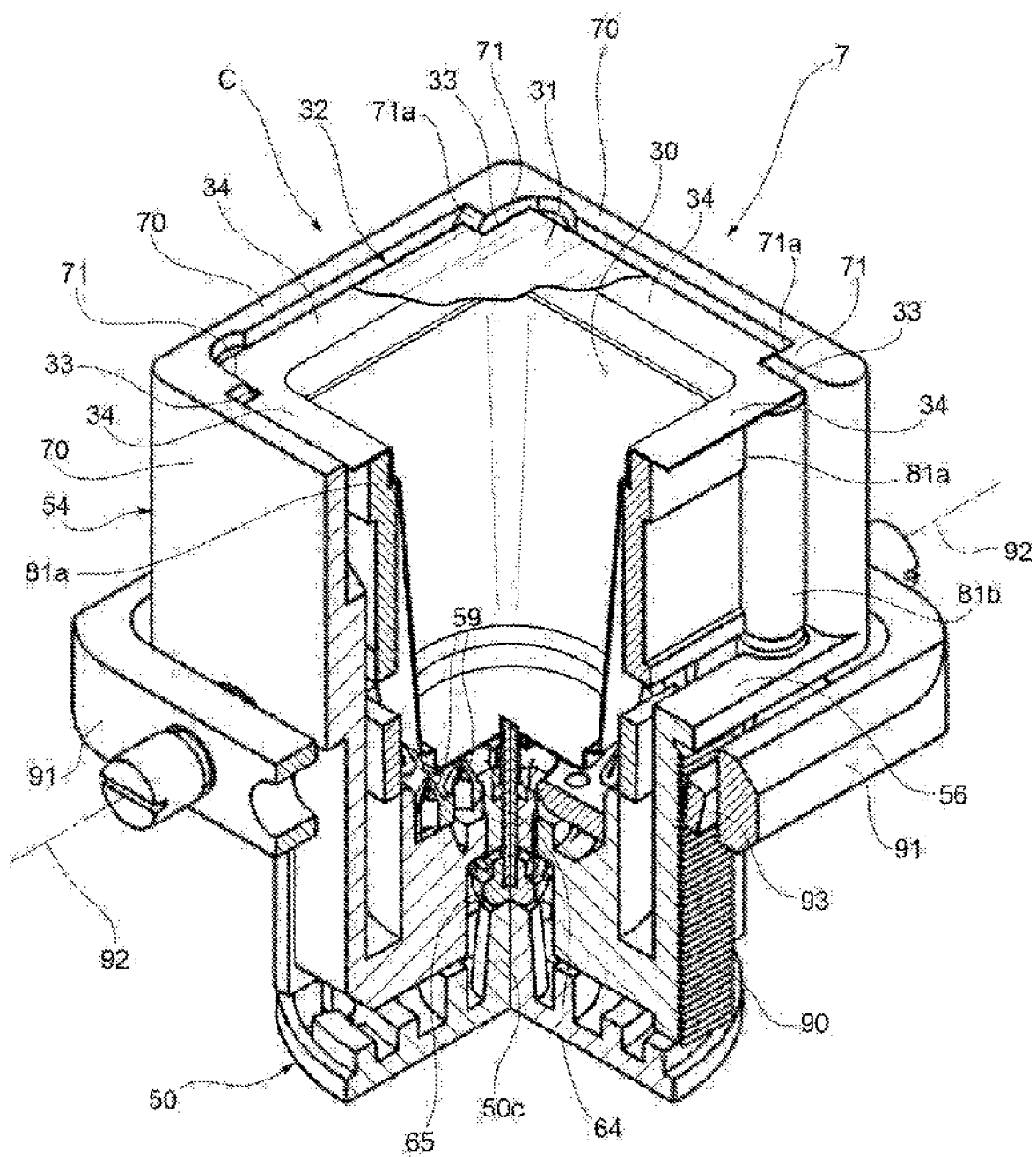
Figure 24:
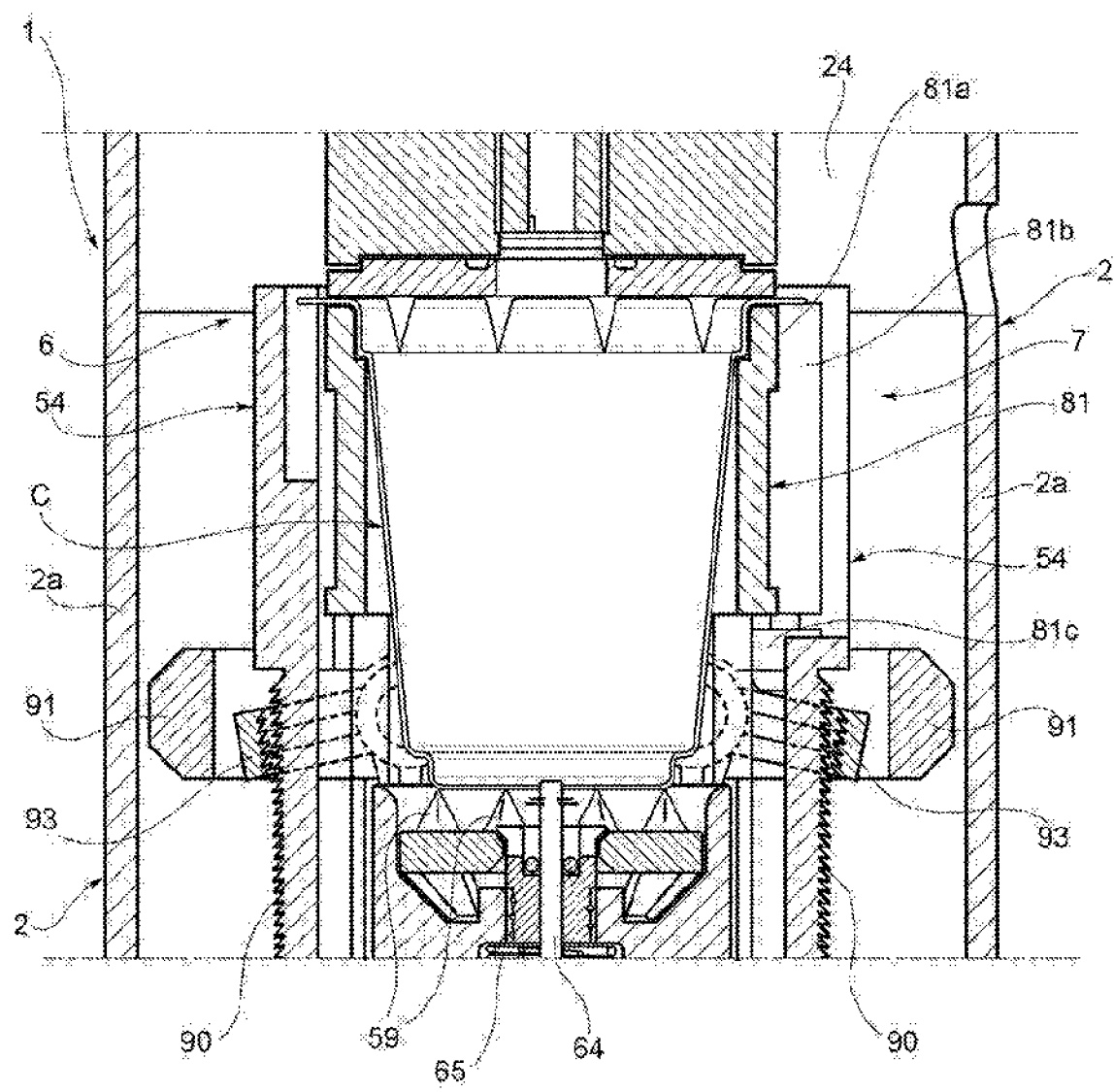
FIG. 24 is a partial sectional view of a variant embodiment of a brewing unit that can be used according to the present invention.

In the embodiment shown in FIGS. 21 to 23, in place of two opposed appendages, the receiving element 54 preferably comprises three upper walls 70, preferably interconnected, extending substantially along three sides of a square.

Each of these walls 70 of the face turned towards the axis of the capsule carrier unit 7 has a respective projecting formation 71 essentially shaped in the form of a right-angled triangle or trapezium, with an inclined side or hypotenuse 71a.

The projecting formations 71 can interact with the indentations 33 and the protrusions 34 of the flange 32 of a capsule of a type shown in FIGS. 18a to 20b, in a similar way to what is described above in respect of the system shown in FIGS. 1 to 16.

The solution according to FIGS. 21 to 24 also includes means for locking the relative axial position of the receiving element 54 and of the delimiting element 81 in the operating condition. In the embodiment shown in this figures, the locking means in question comprise a pair of racks 90, only one of which is visible in FIGS. 21 to 23, the other being placed on the diametrically opposite side of the longitudinal axis of the capsule carrier unit 7.

The racks 90 are integral with the receiving element 54, and extend vertically, with their teeth facing outwards.

A support ring 91, which is stationary in use, extends around the capsule carrier unit 7, and extends around the racks 90 and is spaced apart from them.

On two opposed sides of the support ring 91, two toothed members 93 are pivoted rotatably about respective parallel horizontal axes 92 and extend between this ring and the racks 90. The elements 93 have their respective teeth facing those of the racks 90.

By known means, such as respective return springs that are not visible in the drawings, the toothed elements 93 are normally held in an angular position such that their teeth are disengaged from those of the associated racks 90.

As can be seen, for example, in FIGS. 21 and 22, the columns or pillars 81b of the delimiting element 81 have respective heads 81c on their lower ends, vertically facing, at least partially, corresponding portions of the toothed members 93.

With reference, for example, to FIG. 22, when a capsule C of the type shown in FIGS. 19a and 19b is introduced into the capsule carrier unit 7, the coupling of the indentations 33 and protrusions 34 of its flange 32 determine the height or depth at which the capsule C bears inside the receiving element 54.

As soon as the flange 32 of this capsule C comes to engage the top edge of the upper portion 81a of the delimiting element 81, the further descent of the capsule C also causes the descent of the delimiting element 81 and of the associated columns or pillars 81b. The terminal heads 81c of the columns or pillars then interact with the toothed members 93, causing them to oscillate downwards about the respective axes 92, so that their teeth are made to engage partially with the teeth of the facing racks 90. The position of the delimiting element 81 relative to the receiving element 54 is then stably locked.

In all other respects, the modes of operation of a machine comprising a capsule carrier unit shown in FIGS. 21 to 24 are similar to those of the machine described previously, and will therefore not be described further here.

Figure 25:
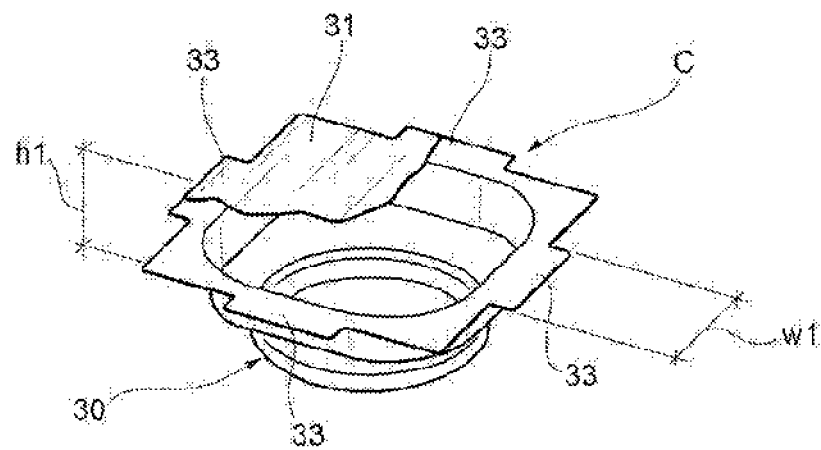
FIGS. 25 to 27 are perspective views of variant embodiments of capsules that can be used in a system according to the present invention.
Figure 26:
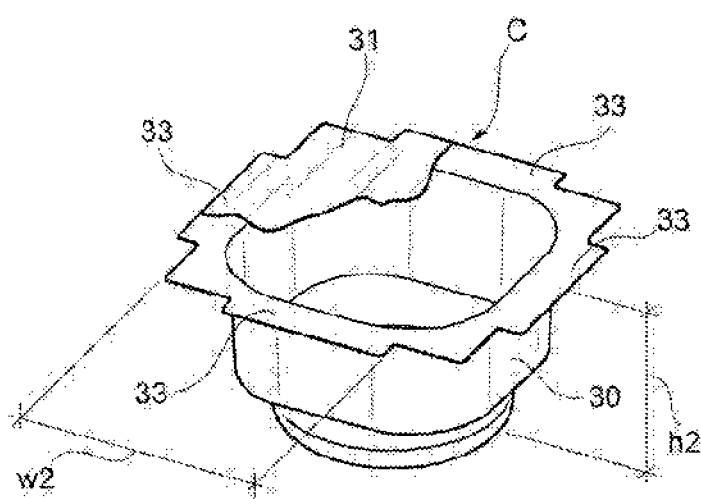
Figure 27:
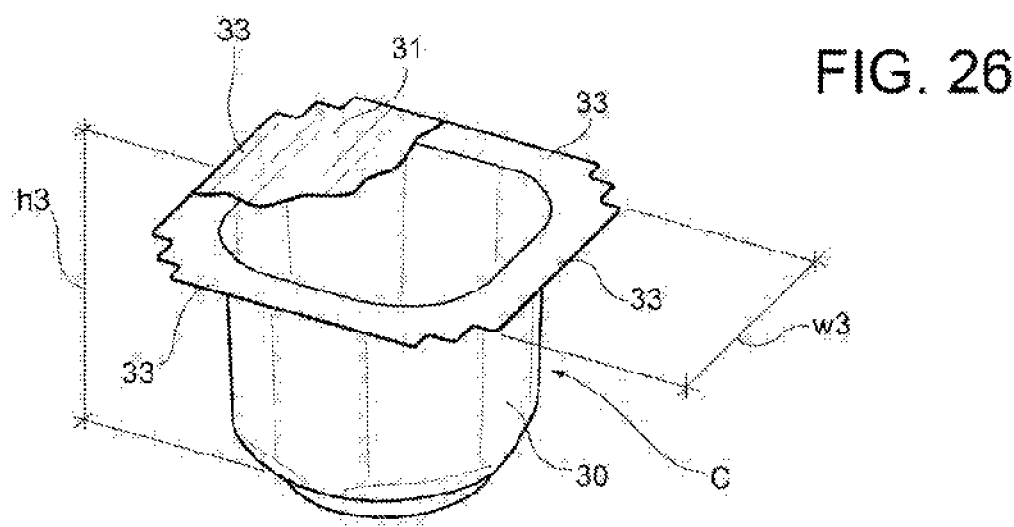

FIGS. 25 to 27 show three further types of capsule C that can be used in a system according to the present invention.

The capsules C shown in these figures are characterized in that they have, in intermediate portions of the sides of their flanges 32, respective projections or protuberances 33, having perimetric dimensions or widths w1, w2 and w3 respectively, correlated in an ordered way with the respective axial lengths or heights h1, h2 and h3.

The capsules shown in FIGS. 25 to 27 can be used with a machine of the type described with reference to FIGS. 1 to 16, in which the facing appendages 70 of the capsule carrier unit 7 have, in place of the projecting formations 71a, recessed formations, for example formations which are also in the form of isosceles triangles but with their vertices pointing downwards.

The modes of use and operation of a machine modified in this way correspond substantially to those of the machine described previously, and will therefore not be described further here.

Naturally, the principle of the invention remaining the same, the forms of embodiment and the details of construction may be varied widely with respect to those described and illustrated, which have been given purely by way of non-limiting example, without thereby departing from the scope of the invention as defined by the attached claims.

The invention claimed is:

1. A system for the preparation of beverages, comprising:
    capsules (C) of different types, wherein each capsule (C) has a cup-shaped body (30) provided at a top end of the cup-shaped body with an outwardly protruding transverse flange (32) and at a bottom end of the cup-shaped body with a bottom wall, and wherein said different types of capsules (C) have respective different axial lengths (h1, h2, h3), and
    a brewing unit (6, 20, 7), in which there is defined a variable-volume brewing chamber (100) with a lateral delimiting part (81, 81a) and a slidable end delimiting part (54, 55), for receiving capsules (C) of said types introduced into said chamber (100), wherein said end delimiting part (54) is provided with perforating elements (57, 59, 64) adapted to perforate the bottom wall of the capsule (C) received in the brewing chamber (100);
    wherein respective flanges of the capsules (C) of said different types have correspondingly different shapes, and said end delimiting part (54, 55) of the brewing chamber (100) carries stop elements (70, 71) adapted to be coupled to the flanges (32) of said different types of capsules (C) when the capsules (C) are introduced into the brewing chamber (100), so as to allow correspondingly different relative movements of the end delimiting part (54, 55) relative to the lateral delimiting part (81, 81a) of said chamber (100),
    wherein the system further comprises a bearing structure (2) which is stationary in operation and includes a support casing (2) inside which the brewing unit (6, 20, 7) is mounted, wherein said lateral delimiting part (81, 81a) of the variable-volume brewing chamber (100) is movable relative to the bearing structure (2), and the brewing unit (6, 20, 7) has associated locking elements (80, 86a, 86b; 90, 93) arranged to be driven by a movement of said lateral delimiting part (81, 81a) for locking the position of the lateral delimiting part (81, 81a) in a relative position which is different for each of said types of capsules (C).

2. The system according to claim 1, wherein said locking elements comprise
    a drum (80, 56) which is integral with said end delimiting part (54, 55) of the brewing chamber (100), and
    at least one block (86a, 86b) connected to said lateral delimiting part (81, 81a, 81b) in such a way that a movement of said lateral delimiting part (81, 81a, 81b) relative to the bearing structure (2) is able to cause said at least one block (86a, 86b) to be brought against an interacting surface of the drum (56, 80).

3. The system according to claim 1, wherein said locking elements comprise
    at least one rack (90) integral with the end delimiting part (54, 55) of the brewing chamber (100), and
    at least one movable toothed member (93) movable, under control by the lateral delimiting part (81, 81a, 81b, 81c), between a rest position and a working position in which said at least one movable toothed member (93) is disengaged and engaged, respectively, with said at least one rack (90).

4. The system according to claim 1, wherein each flange (32) of said capsules (C) has at least one indentation or a protrusion (33) having a perimetric dimension (w1, w2, w3) which is correlated with the axial length or height (h1, h2, h3) of said capsules (C).

5. The system according to claim 4, wherein each flange (32) of said capsules (C) has a polygonal, general shape.

6. The system according to claim 5, wherein an indentation or a protrusion (33) is placed in an intermediate position of at least one side of each flange (32) of said capsules (C) or in an end part of at least one side of each flange (32) of said capsules (C).

7. The system according to claim 1, wherein said perforating elements (57) comprise a perforating needle or pin (64) mounted axially movably in said end delimiting part (54) of the brewing chamber (100) and adapted to be urged to perforate the bottom wall of said capsule (C).

8. A system for the preparation of beverages, comprising:
    capsules (C) of different types, wherein each capsule (C) has a cup-shaped body (30) provided at a top end of the cup-shaped body with an outwardly protruding transverse flange (32) and at a bottom end of the cup-shaped body with a bottom wall, and wherein said different types of capsules (C) have respective different axial lengths (h1, h2, h3), and
    a brewing unit (6, 20, 7), in which there is defined a variable-volume brewing chamber (100) with a lateral delimiting part (81, 81a) and a slidable end delimiting part (54, 55), for receiving capsules (C) of said types introduced into said chamber (100), wherein said end delimiting part (54) is provided with perforating elements (57, 59, 64) adapted to perforate the bottom wall of the capsule (C) received in the brewing chamber (100);
    wherein respective flanges of the capsules (C) of said different types have correspondingly different shapes, and said end delimiting part (54, 55) of the brewing chamber (100) carries stop elements (70, 71) adapted to be coupled to the flanges (32) of said different types of capsules (C) when the capsules (C) are introduced into the brewing chamber (100), so as to allow correspondingly different relative movements of the end delimiting part (54, 55) relative to the lateral delimiting part (81, 81a) of said chamber (100), and
    wherein the brewing unit (6, 20, 27) comprises a water and/or steam injection head (6), to which there is connected a retaining and guiding device (20) adapted to receive and guide a capsule (C) of said types towards a predetermined working position relative to said head (6); the injection head (6) and the associated retaining and guiding device (6) being movable to a working position in which the capsule (C) is placed in said brewing chamber (100).

9. The system according to claim 8, wherein the retaining and guiding device (20) comprises
first guides (28) adapted to receive and guide the flange (32) of a capsule (C) towards the injection head (6) and to retain the flange (32) until the flange (32) engages said lateral delimiting part (18, 81a) of the brewing chamber (100);
second guides (38), staggered with respect to said first guides (28) along the direction of movement of the capsule, on the opposite side of said first guides (28) from the brewing chamber (100);
movable retaining elements (40, 40a) being provided, adapted to permit the passage of the flange (32) of said capsule (C) from the first guides (28) to the second guides (38) after said flange (32) has engaged said lateral delimiting part (81a) of the brewing chamber (100).

10. A machine for use in a system for the preparation of beverages, comprising:
capsules (C) of different types, wherein each capsule (C) has a cup-shaped body (30) provided at a top end of the cup-shaped body with an outwardly protruding transverse flange (32) and at a bottom end of the cup-shaped body with a bottom wall, and wherein said different types of capsules (C) have respective different axial lengths (h1, h2, h3), and
a brewing unit (6, 20, 7), in which there is defined a variable-volume brewing chamber (100) with a lateral delimiting part (81, 81a) and a slidable end delimiting part (54, 55), for receiving capsules (C) of said types introduced into said chamber (100), wherein said end delimiting part (54) is provided with perforating elements (57, 59, 64) adapted to perforate the bottom wall of the capsule (C) received in the brewing chamber (100);
wherein respective flanges of the capsules (C) of said different types have correspondingly different shapes, and said end delimiting part (54, 55) of the brewing chamber (100) carries stop elements (70, 71) adapted to be coupled to the flanges (32) of said different types of capsules (C) when the capsules (C) are introduced into the brewing chamber (100), so as to allow correspondingly different relative movements of the end delimiting part (54, 55) relative to the lateral delimiting part (81, 81a) of said chamber (100),
further comprising a brewing unit (6, 20, 7) in which there is defined a variable-volume brewing chamber (100), with a lateral delimiting part (81, 81a) and a slidable end delimiting part (54, 55), for receiving capsules (C) of the aforesaid types introduced into said chamber (100), wherein said end delimiting part (54) is provided with perforating elements (57, 59, 64) adapted to perforate the bottom wall of the capsule (C) received in the brewing chamber (100);
said end delimiting part (54, 55) of the brewing chamber (100) carrying stop elements (70, 71) adapted to be coupled to the flanges (32) of said different types of capsules (C) when the capsules (C) are introduced into the brewing chamber (100), so as to allow correspondingly different relative movements of the end delimiting part (54, 55) relative to the lateral delimiting portion (81, 81a) of said chamber (100); and
a bearing structure (2) which is stationary in operation and includes a support casing (2) inside which the brewing unit (6, 20, 7) is mounted, wherein said lateral delimiting portion (81, 81a) of the variable-volume brewing chamber (100) is movable relative to the bearing structure (2), and the brewing unit (6, 20, 7) has associated locking elements (80, 86a, 86b; 90, 93) arranged to be driven by a movement of said lateral delimiting portion (81, 81a), for locking the lateral delimiting portion (81, 81a) in a relative position which is different for each of said types of capsules (C).

11. The machine according to claim 10, wherein said locking elements comprise
a drum (80, 56) which is integral with said end delimiting part (54, 55) of the brewing chamber (100), and
at least one block (86a, 86b) connected to said lateral delimiting part (81, 81a, 81b) in such a way that a movement of said lateral delimiting part (81, 81a, 81b) relative to the bearing structure (2) is able to cause said at least one block (86a, 86b) to be brought against an interacting surface of the drum (56, 80).

12. The machine according to claim 11, wherein said locking elements comprise
at least one rack (90) integral with the end delimiting part (54, 55) of the brewing chamber (100), and
at least one movable toothed member (93) movable, under control by the lateral delimiting part (81, 81a, 81b, 81c), between a rest position and a working position in which said at least one movable toothed member (93) is disengaged and engaged, respectively, with said at least one rack (90).

13. The machine according to claim 10, wherein said perforating elements (57) comprise a perforating needle or pin (64) mounted axially movably in said end delimiting portion (54) of the brewing chamber (100) and adapted to be urged to perforate the bottom wall of said capsule (C).

14. A machine for use in a system for the preparation of beverages, comprising:
capsules (C) of different types, wherein each capsule (C) has a cup-shaped body (30) provided at a top end of the cup-shaped body with an outwardly protruding transverse flange (32) and at a bottom end of the cup-shaped body with a bottom wall, and wherein said different types of capsules (C) have respective different axial lengths (h1, h2, h3), and
a brewing unit (6, 20, 7), in which there is defined a variable-volume brewing chamber (100) with a lateral delimiting part (81, 81a) and a slidable end delimiting part (54, 55), for receiving capsules (C) of said types introduced into said chamber (100), wherein said end delimiting part (54) is provided with perforating elements (57, 59, 64) adapted to perforate the bottom wall of the capsule (C) received in the brewing chamber (100);
wherein respective flanges of the capsules (C) of said different types have correspondingly different shapes, and said end delimiting part (54, 55) of the brewing chamber (100) carries stop elements (70, 71) adapted to be coupled to the flanges (32) of said different types of capsules (C) when the capsules (C) are introduced into the brewing chamber (100), so as to allow correspondingly different relative movements of the end delimiting part (54, 55) relative to the lateral delimiting part (81, 81a) of said chamber (100),
further comprising a brewing unit (6, 20, 7) in which there is defined a variable-volume brewing chamber (100), with a lateral delimiting part (81, 81a) and a slidable end delimiting part (54, 55), for receiving capsules (C) of the aforesaid types introduced into said chamber (100), wherein said end delimiting part (54) is provided with perforating elements (57, 59, 64) adapted to perforate the bottom wall of the capsule (C) received in the brewing chamber (100);

said end delimiting part (54, 55) of the brewing chamber (100) carrying stop elements (70, 71) adapted to be coupled to the flanges (32) of said different types of capsules (C) when the capsules (C) are introduced into the brewing chamber (100), so as to allow correspondingly different relative movements of the end delimiting part (54, 55) relative to the lateral delimiting portion (81, 81*a*) of said chamber (100), wherein the brewing unit (6, 20, 27) comprises a water and/or steam injection head (6), to which there is connected a retaining and guiding device (20) adapted to receive and guide a capsule (C) of said types towards a predetermined working position relative to said head (6); the injection head (6) and the associated retaining and guiding device (20) being movable to a working position in which the capsule (C) is placed in said brewing chamber (100).

15. The machine according to claim 14, wherein the retaining and guiding device (20) comprises first guides (28) adapted to receive and guide the flange (32) of a capsule (C) towards the injection head (6) and to retain the flange (32) until the flange (32) engages said lateral delimiting portion (18, 81*a*) of the brewing chamber (100); and second guides (38), staggered with respect to said first guides (28) along the direction of movement of the capsule, on the opposite side of said first guides (28) from the brewing chamber (100);

movable retaining elements (40, 40*a*) being provided, adapted to permit the passage of the flange (32) of said capsule (C) from the first guides (28) to the second guides (38) after said flange (32) has engaged said lateral delimiting part (81*a*) of the brewing chamber (100).

\* \* \* \* \*